Feb. 14, 1950 G. R. PAINE ET AL 2,497,513
RADIO NAVIGATION SYSTEM
Filed June 10, 1948 15 Sheets-Sheet 1

GEORGE R. PAINE
WILLIAM C. PLATT
INVENTORS

BY
ATTORNEY

GEORGE R. PAINE
WILLIAM G. PLATT,
INVENTORS

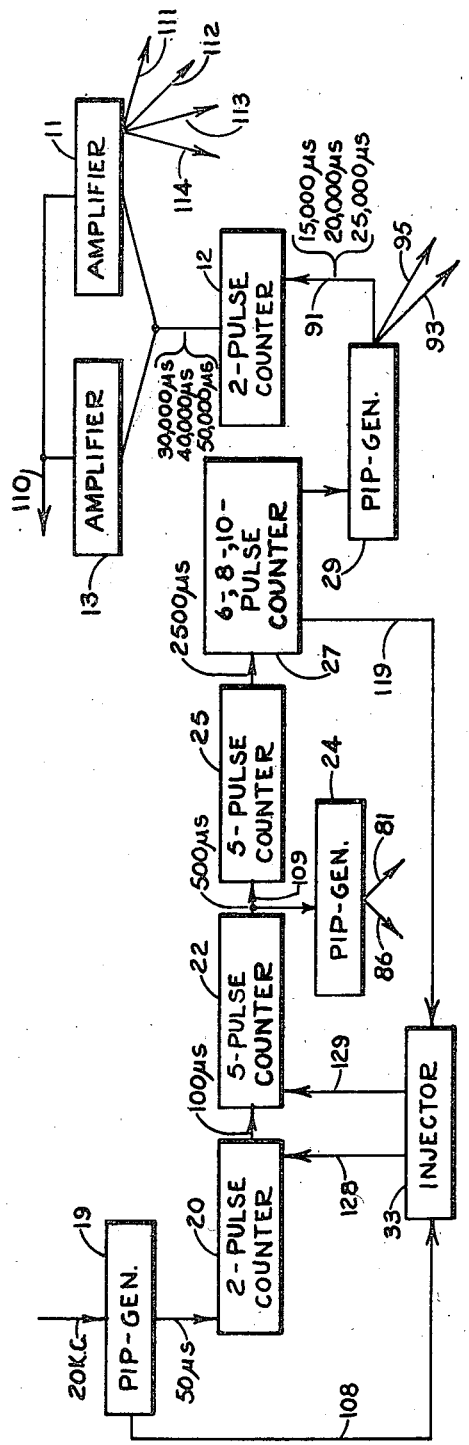
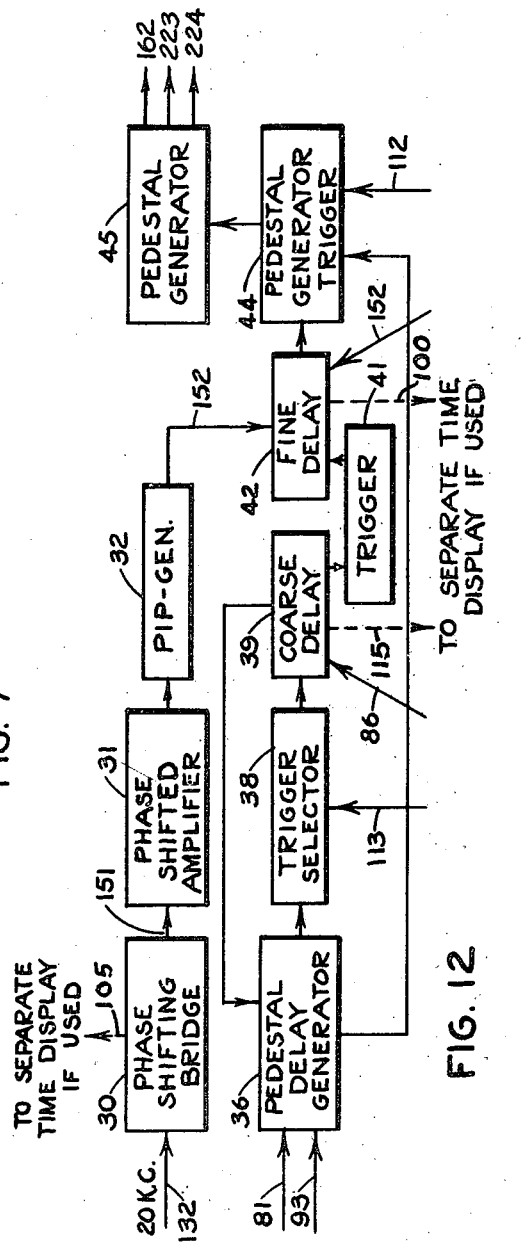
FIG. 7
FIG. 12
GEORGE R. PAINE
WILLIAM C. PLATT,
INVENTORS
BY
ATTORNEY

GEORGE R. PAINE
WILLIAM C. PLATT,
INVENTORS

Feb. 14, 1950 G. R. PAINE ET AL 2,497,513
RADIO NAVIGATION SYSTEM
Filed June 10, 1948 15 Sheets-Sheet 6

GEORGE R. PAINE
WILLIAM C. PLATT,
INVENTOR

BY *H. J. Mackey*
ATTORNEY

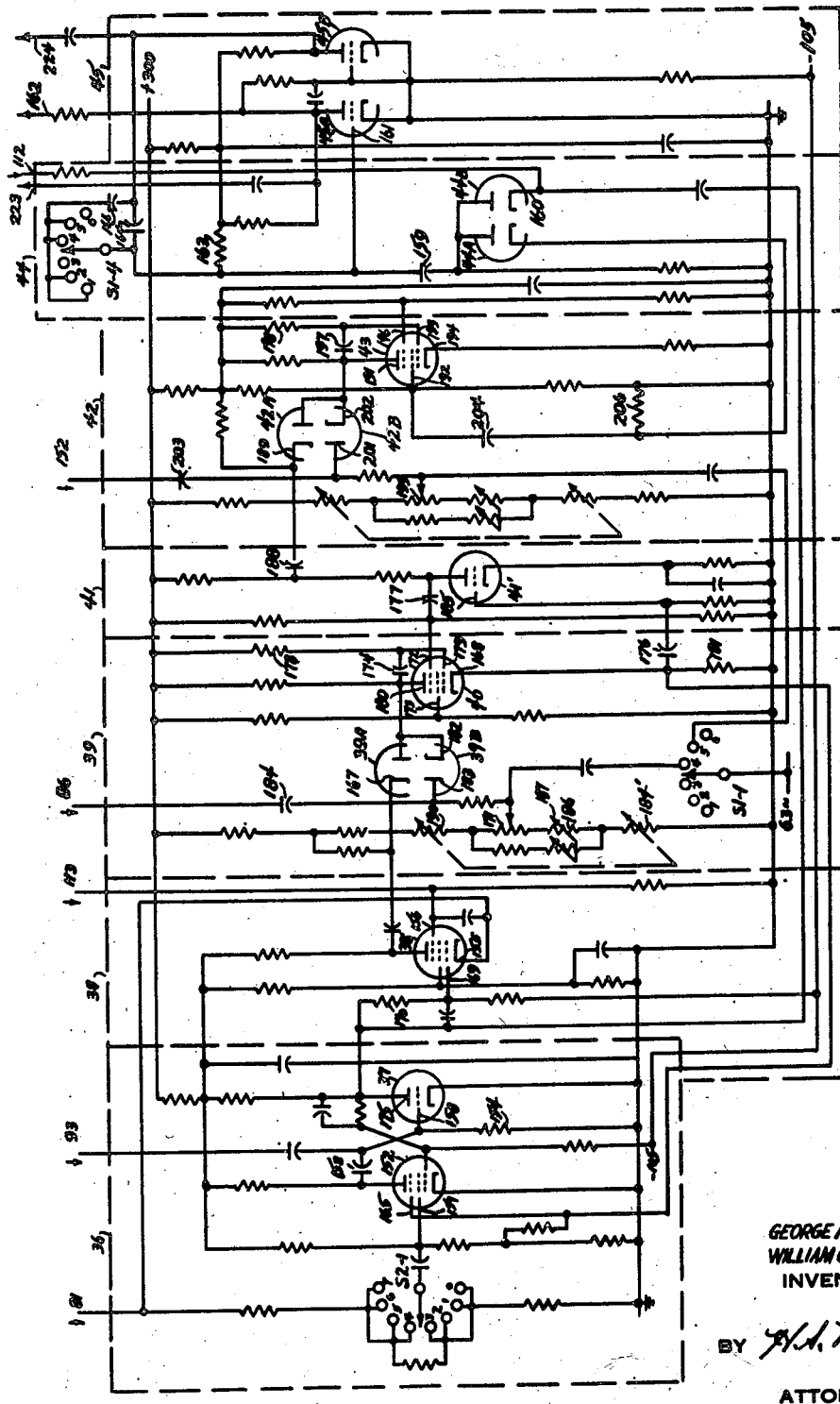

GEORGE R. PAINE
WILLIAM C. PLATT,
INVENTORS

BY *H. L. Mackey*
ATTORNEY

Feb. 14, 1950     G. R. PAINE ET AL     2,497,513
RADIO NAVIGATION SYSTEM

Filed June 10, 1948     15 Sheets-Sheet 10

GEORGE R. PAINE
WILLIAM C. PLATT,
INVENTORS

BY
ATTORNEY

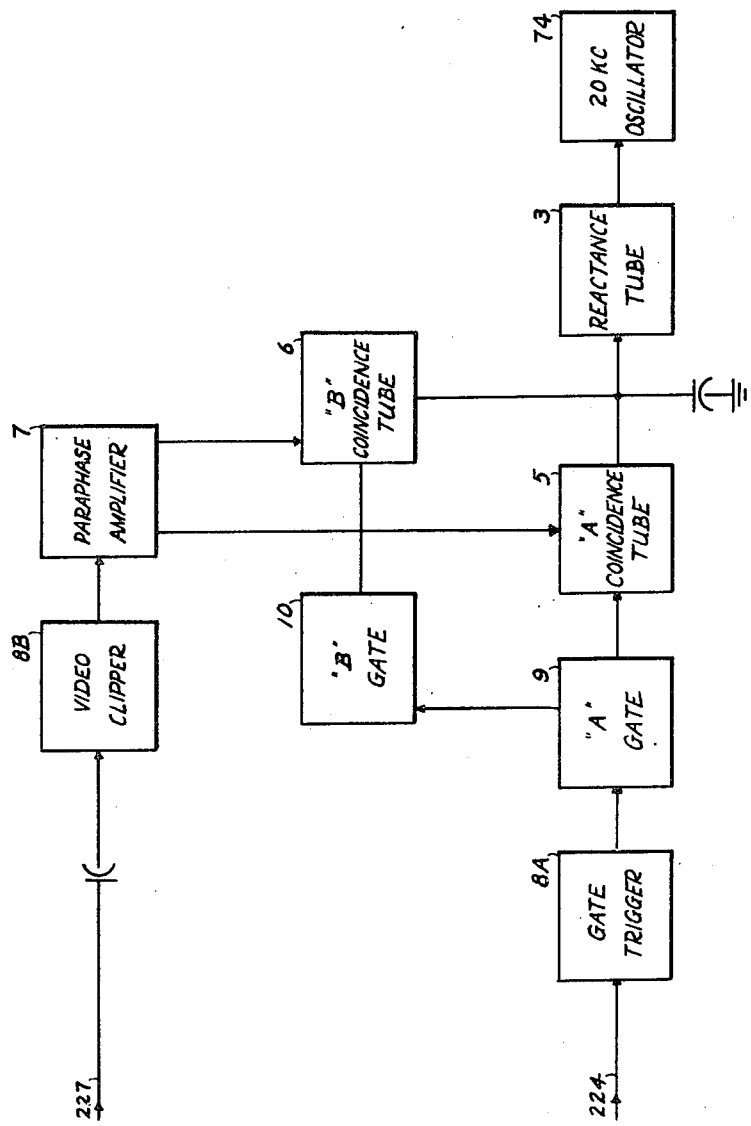

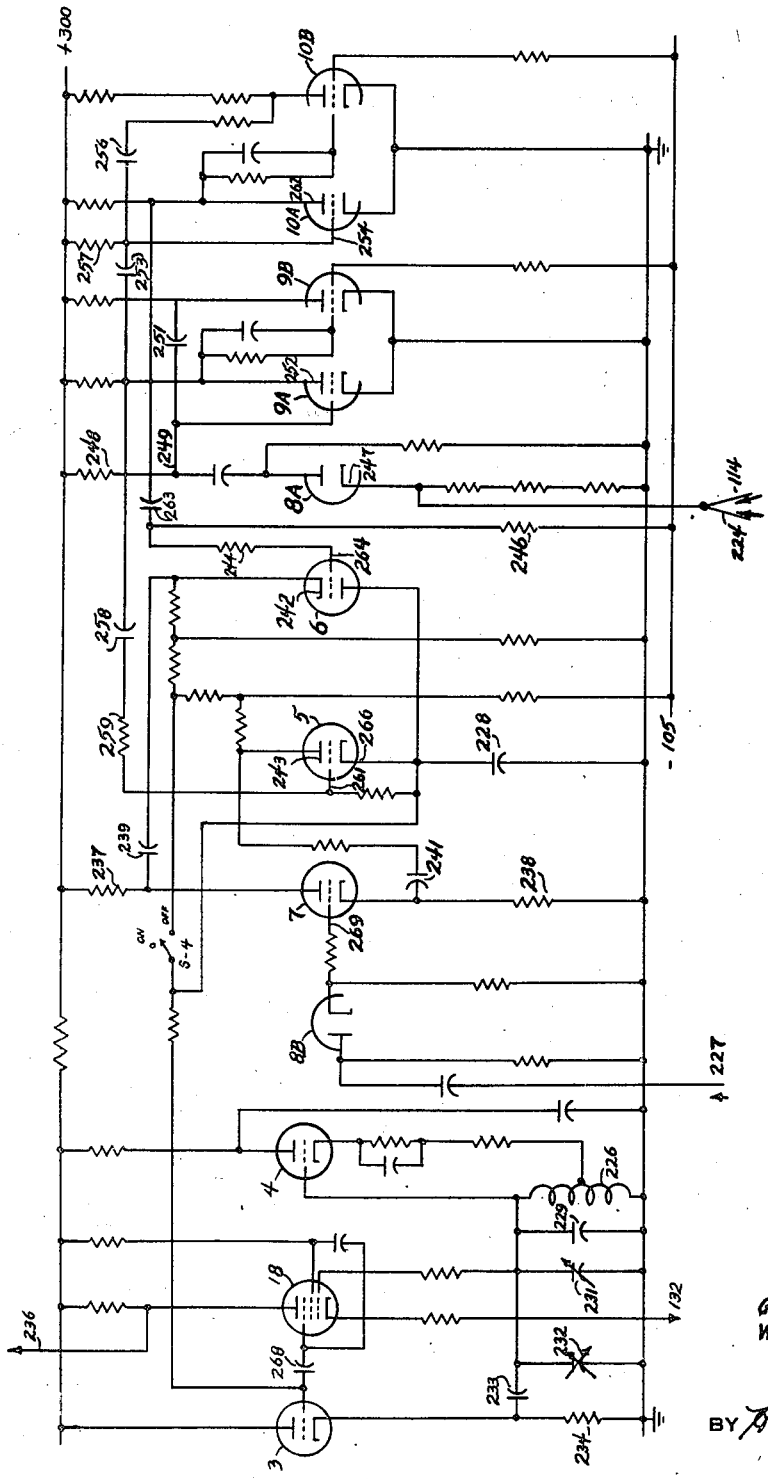

Feb. 14, 1950   G. R. PAINE ET AL   2,497,513
RADIO NAVIGATION SYSTEM
Filed June 10, 1948   15 Sheets-Sheet 15

GEORGE R. PAINE
WILLIAM C. PLATT,
INVENTORS

BY *H. A. Mackey*
ATTORNEY

Patented Feb. 14, 1950

2,497,513

UNITED STATES PATENT OFFICE 2,497,513

RADIO NAVIGATION SYSTEM

George R. Paine and William C. Platt, Pleasantville, N. Y., assignors to General Precision Laboratory Incorporated, a corporation of New York Application June 10, 1948, Serial No. 32,096

15 Claims. (Cl. 343—103)

This invention relates to radio navigation systems depending on the measurement of the time of arrival of two or more radio signals sent synchronously from known points.

Navigation systems of this type, such as that commonly called Loran, employ pairs of ground stations, each pair transmitting pulses of radio energy with a precisely fixed time relation between the two pulse transmissions. A receiving station on a ship or airplane, by measuring the difference in time of reception of the pulses from a transmitting pair, learns that it is somewhere on a line on the earth's surface where the signals would be received with such a time difference. By tuning to a second transmitting pair and again measuring the signal time difference, position on a second line is determined; the intersection of the two lines of position represents the vehicle's position. Special maps carrying time difference lines and indicating locations of, and data for, many pairs of transmitting stations cover some 25% of the earth's surface and are in general use.

The speed of radio signals in space being that of light, the time intervals which have to be measured by the receiving station are small; in fact, they must be measured with an accuracy of about one millionth of a second ($\mu$s). Such a receiving station therefore contains an electronic clock or oscillator capable of great accuracy, from which are generated several electrical frequencies used to measure the small time differences of the incoming pairs of signals.

The actual measurement is done visually, therefore, receiving stations include a cathode ray tube upon the screen of which are displayed the received signals, or pips, together with locally generated signals for synchronization of the receiver with the received signals and for measurement of the difference in time of reception of the signals. There may also be displayed on the screen locally-generated luminous linear scales marked in microseconds for use in measurement by the operator of the signal time differences or, instead, measurement may be made in a separate unit and not on the cathode ray tube screen.

Heretofore it has been necessary to adjust by hand the position of one of the received signal pips to a particular point on the scale representing zero time and to maintain it there by continuous manual readjustment, so that the distance in scale divisions and microseconds to the second received signal pip can be measured.

To accomplish this manual adjustment a switch has customarily been provided for adjusting the position of one of the received signal pips to a particular scale point representing zero time; the operation of this switch causes the pips to drift or move along the scale toward the right or left. When the pip arrives at the point judged by the operator to be its required zero position, he restores the switch. This operation has been found in practice to have two disadvantages: the speed of drift may be too slow and the operation therefore very time-consuming, taking minutes if the distance to be drifted is great, and on the other hand unless the speed of drift is exceedingly slow the pip can only with difficulty or by chance be stopped at exactly the required point.

This invention substitutes variable velocity adjustment of zero pip position for the previous type which may be termed displacement adjustment. It eliminates both disadvantages of the previously-used method and in addition employs automatic zero velocity restoration. The invention is especially effective when used in conjunction with automatic signal synchronization maintenance, to be described later.

In the measurement of time differences by received signals three or four scale or trace magnitudes on the screen are customarily used consecutively to permit first rough synchronization and perhaps measurement, then repetition with more and more accuracy. At all times it has heretofore been necessary manually to maintain one of the signal pips in the aforementioned position representing zero time to compensate for fortuitous oscillator drift, by momentary operation of the above-mentioned switch or by change of the basic oscillator frequency. Likewise measurement of time differential involves some guesswork, as the signal pip will have slanting sides and may be of an irregular shape, constantly changing as radio space transmission conditions change from instant to instant. Other interference, classed as video "noise," may make the signal jump about, and unless the operator is constantly alert, this zero-set pip may drift or jump out of setting unnoticed. There thus has been an error of observation involved in this zero setting maintenance, which has added to any error of observation that may have occurred in the actual scale reading.

This invention eliminates the necessity for continuously readjusting one of the received pips to a point representing zero on the screen, this continuous readjustment being accomplished automatically, without any attention by the operator except under conditions of extraordinary noise interference, and the adjustment is maintained far more reliably and stably than is possible by hand.

An object of the present invention is to provide a novel and improved combination of means for long range navigation using radio signals received from pairs of fixed transmitting stations.

Another object of the present invention is to provide an improved method of and means for signal synchronization in such navigation means.

A further object of this invention is to provide an improved method of and means for automatic signal synchronization maintenance in such navigation means.

Other objects, features and advantages of the invention will be apparent from the following description taken in connection with the accompanying drawing, in which:

Figures 6, 7 and 12 are functional charts of components of the timer.

Figures 8, 9, 10, 11, 13, 14 and 16 show schematically the wiring of component circuits of the timer.

Figure 17 is a functional chart of the automatic signal synchronization maintenance unit.

Figures 19 and 20 show schematically the wiring of the automatic signal synchronization maintenance unit and the variable velocity signal phase shifter.

Figure 1:
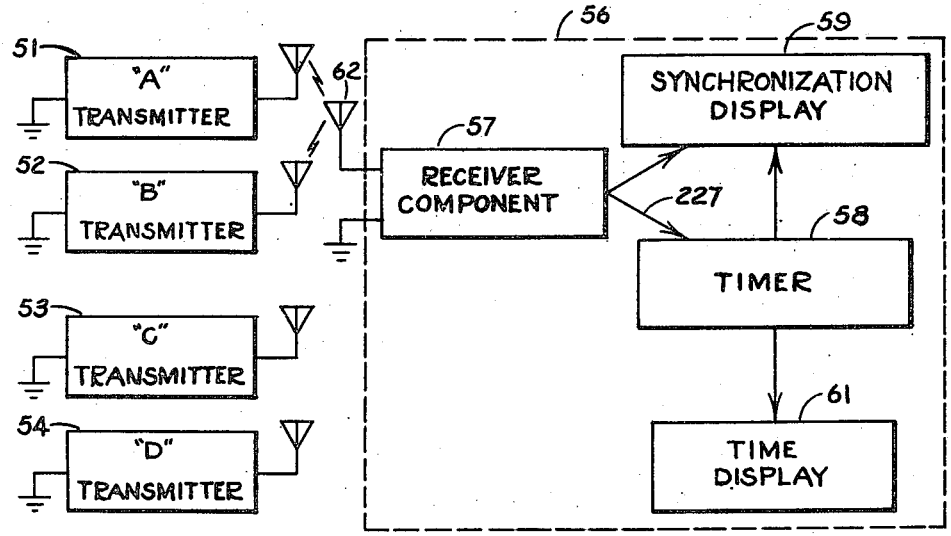
Figure 1 is a functional chart of the principal components of a long range navigation system.

In Figure 1, four transmitters, 51, 52, 53 and 54 form two pairs, the two stations of each pair transmitting on the same radio frequency and at the same pulse repetition rate, and maintaining a precisely designed and accurately maintained synchronization between the pulse transmission times from the two stations. Specifically let it be assumed for purposes of illustration that transmitters 51, termed "A" or master station, and 52, termed "B" or slave station, transmit on 1950 kilocycles radio frequency at a pulse repetition rate of 25 per second, where "kilocycles" here and hereafter are taken to mean "kilocycles per second." A receiver incorporating this invention is indicated by the dashed enclosure 56 and may be called for convenience a Marine Loran receiver. Its larger components, excluding power supplies and other usual parts, include a receiver component 57, timer 58, synchronization display 59 and perhaps a separate time display 61, which may however be combined with the synchronization display.

The receiver component may be similar to that described in Electronics Magazine for December, 1945, vol. 18, No. 12, page 113. In general this component receives through the receiving antenna 62 radio frequencies which have been pulsed from the transmitters ("frequencies" being understood to mean here and throughout, electrical quantities of said frequencies). The receiver distinguishes between different radio frequencies, selects the desired frequency for which it is set, demodulates it and delivers the signals as direct current pulses (video signals) to timer 58 and to synchronization display 59.

Timer 58 receives the direct current pulses (video signals) from the receiver component and also generates six electrical pulse repetition frequencies for use in measuring the time intervals between the pulses transmitted by "A" transmitter 51 and "B" transmitter 52, called hereafter A pulses and B pulses. The six frequencies are related to one another geometrically and can be synchronized with the received pulses both as to rate and phase. The output of timer 58 consists of various pulses and other wave forms impressed on synchronization display 59, and may also include mechanical shaft rotations transmitted to time display 61 if the latter is separate from the synchronization display.

Synchronization display 59 consists of a cathode ray tube and associated equipment. A suitable tube is described in Radar System Engineering by Ridenour, 1st edition, page 499. The tube contains two pairs of electrostatic deflecting plates, the "horizontal" pair giving horizontal deflections to the cathode ray, and the "vertical" pair giving vertical deflections. It also contains the usual cathode, control grid, second control grid and fluorescent screen. Tube elements receive pulses and potentials from timer 58 and video signals from receiver component 57, so that the ray traces one or two luminous horizontal lines with vertical humps or pips representing received signals, and pedestals and vertical lines which mark subdivisions of the horizontal lines and therefore represent various time subdivisions in microseconds.

Transmitted signals such as Loran signals are not only characterized by specific radio frequencies and by a basic pulse repetition rate, but in order further to distinguish between pairs of transmitters an additional small variation in pulse repetition rate between pairs of stations is employed. Eight variations are in use, known by digits zero to 7 inclusive, called station numbers, and differ successively in periods by 100 microseconds. Three basic pulse repetition rates are in use, being 33⅓, 25 and 20 pulses per second and characterized by letters H, L and S respectively. Representing the basic pulse repetition period by P and the station number by N, the pulse repetition period is P—100 N microseconds.

For instance, using basic pulse repetition rate L and station number 5, the pulse repetition period is 40,000—100×5=39,500 microseconds In one embodiment of this invention there is associated with synchronization display 59 a six-position function switch. The first three positions are for use in the normal functioning of the Marine Loran receiver, in which the securing of a "fix" is divided into three corresponding steps. The remaining three positions are for installation and maintenance purposes. Other switches are for selecting the proper radio frequency channel, the basic synchronization rate, and the station number.

The cathode ray tube in all cases displays two horizontal sweeps from left to right, and the number of sweeps per second is always twice the pulse repetition rate, so that two sweeps take place during each pulse period referred to a single transmitting station, and known as the "A" sweep and "B" sweep. The time or period of a sweep may be, for example, either one-half the pulse repetition period, or 1000 microseconds, or 200 microseconds, as controlled by placement of the function switch on positions 1, 2 and 3 respectively. The "A" and "B" sweeps are displaced vertically and hence displayed separately in function switch positions 1 and 2 but are superimposed in function switch position 3.

It is necessary for the cathode ray to return or retrace to the observer's left after tracing a sweep. This is accomplished very rapidly and with the ray intensity reduced, so that its retrace path is not visible to the eye.

Figure 3A:
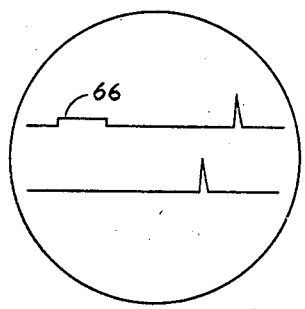
Figures 2, 3A, 3B, 3C and 4 illustrate various cathode ray screen aspects.
Figure 3B:
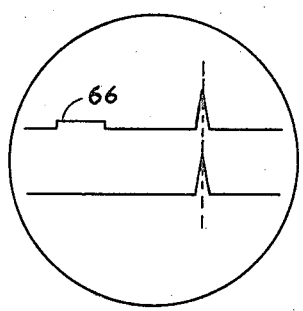
Figure 3C:
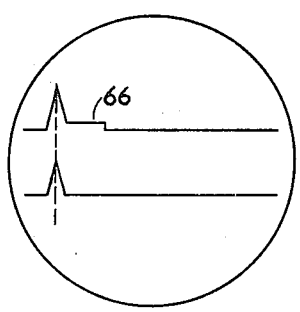
Figure 2:
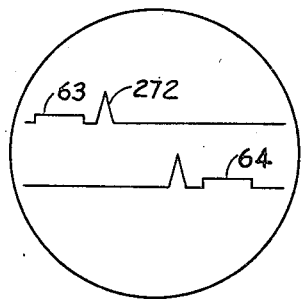
Figure 4:
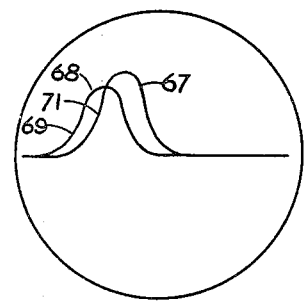

In operation, lack of synchronization between the pulse repetition rate of the transmitting station pair and the sweep rate of the synchronization display results in movement of video pips along the sweep trace, while at exact synchronization the pips are stationary. The operations of synchronization and of correct placement consist, in function switch position 1, of changing the sweep rate until the A pulse of the desired video signal is stationary near the left of the upper trace; the B pulse will then be further toward the right on the B trace. The appearance of the synchronization display screen at this juncture is illustrated in Fig. 2. A pedestal or rectangular raised portion 63 is evident near the left end of the A trace, and another, 64 on the B trace. Each pedestal is 1000 µs long. The A pulse is made approximately stationary by adjustment of the oscillation frequency, then is moved to the A pedestal by momentary manipulation of the variable speed drift adjustment. Next, the B pedestal is moved by adjustment of the coarse and fine delay knobs until it is under the B pulse. The function switch is now turned to position 2, which does not change the sweep repetition rate but enlarges the scale or size of the picture until the 1000 µs pedestals cover the entire sweep lengths. Appearance of the A and B pulses may now be as illustrated in Fig. 3A. By further adjustment of the coarse and fine delay knobs the B pulse is now set directly under the A pulse as shown in Fig. 3B and both are moved simultaneously by momentary manipulation of the variable speed drift adjustment until the A pulse is caught and held in its exact position near the left end of the A sweep by automatic operation of the synchronization maintenance. To facilitate this operation a 100 µs pedestal 66 called "B gate" is evident near the left end of the A trace. This pedestal is the area to which the A pulse should be moved manually, and the left edge of this pedestal is the point to which the center of the A pulse is automatically drawn and locked as soon as it enters the gate. The result is shown in Fig. 3C. A sweep collapse key permits superposition of A and B sweeps in function 2 if desired. Changing to function switch position 3 causes A and B traces to coincide and enlarges the scale so that the first 200 µs of the 1000 µs length occupies the entire screen. Appearance is as in Fig. 4 where 67 represents the A pip and 68 the B pip. Adjustments of the position of the B pip and of the magnitude of either the A or B pip are now made so that its leading edge 69 coincides with leading edge 71 of the A pipe, the latter still being locked automatically in the correct location on the trace. Synchronization of the receiver timer sweep frequency with the received signal pulse repetition frequency and placement of the A and B pulses on the synchronization display in correct position for measurement have now both been completed, and the operator is prepared to make the actual measurement in microseconds of the time difference between the received A and B signals.

This may be done either by superposing upon the cathode ray tube screen sets of luminous linear scales marked in microseconds, and comparing the video pips therewith as described in Electronics Magazine, supra, page 111, or by use of a separate time display, or by any other suitable method of measurement to a time scale of the time interval between reception of an A pulse and the companion B pulse.

Figure 5:
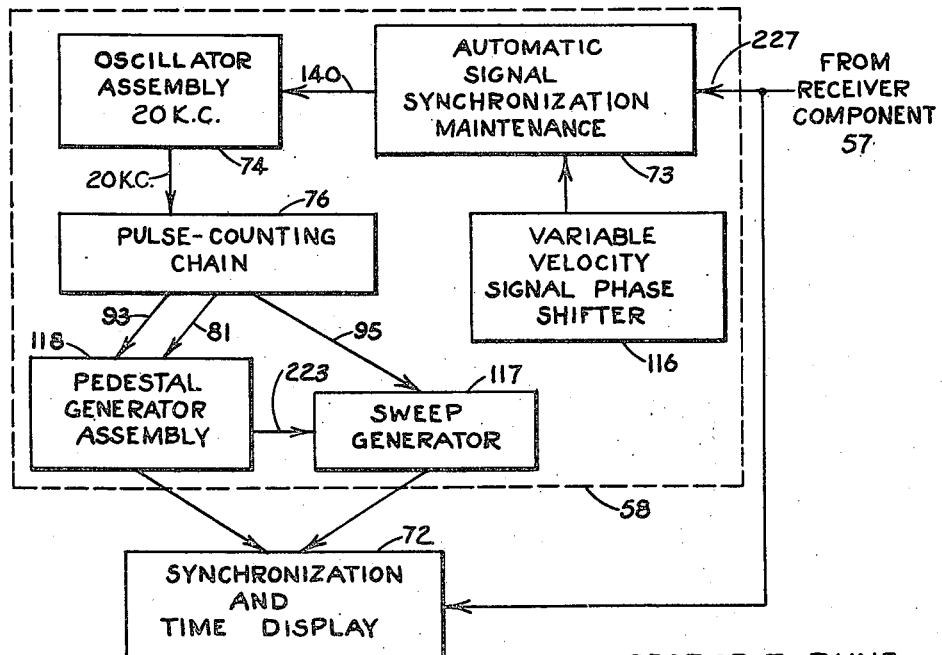
Figure 5 is a functional chart of the timer of a marine Loran receiver.

In Fig. 5 the timer 58 of Fig. 1 is depicted in greater detail, and synchronization display 59 and time display 61 are combined in one rectangle 72. Video signals from receiver component 57, Fig. 1 enter synchronization maintenance component 73, Fig. 5, through lead 227 and also enter synchronization and time display component 72. In synchronization maintenance component 73 these signals, if they occur in time within 100 µs of their appropriate position in the sweep cycle, through lead 140 force local oscillator 74 to change its rate of oscillation, thereby momentarily changing the rate of repetition of the sweep cycle to bring said signals into exactly proper position in the sweep cycle and to hold them there. This circuit will be described in greater detail later. With it is associated variable velocity signal phase shifter circuit 116, the function of which is to bring the signals initially near enough toward synchronization for the synchronization maintenance circuit 73 to seize them, bring them to exact synchronism, and maintain them so.

Figure 6:
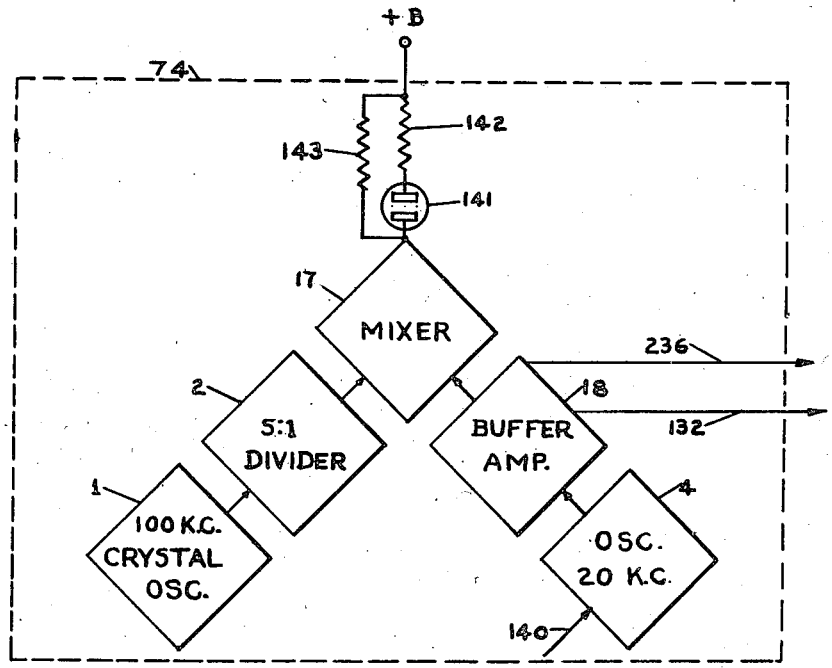

Oscillator assembly 74 is shown in greater detail in Fig. 6. It includes a primary standard reference quartz crystal oscillator and a 20 kc. oscillator, the output of which is converted to very accurate 50 µs markers on which are based the several marker outputs of the pulse-counting chain. Oscillator 4 employs a triode in a conventional Hartley circuit and its frequency can be slightly changed by the automatic signal synchronization maintenance circuit through lead 140. Oscillator 4 feeds the control grid of pentode buffer amplifier 18, which in turn through a cathode follower connection feeds the suppressor grid of pentode mixer 17. The latter may be connected in any usual manner, as for instance as shown in an instruction book published by the General Radio Co., for its beat frequency oscillator model 713B. Mixer 17 also receives through its control grid a standard 20 kc. frequency generated as follows:

Stable 100 kc. crystal oscillator 1 may be of any conventional type, such as that described in Frequency Control With Quartz Crystals, published by Bliley Electric Co., 1940 edition, on page 24. It supplies 100 kc. energy to 5/1 sine wave divider 2, the design of which was described by Ernst Horrman in Proc. I. R. E. for October, 1946 under title, The inductance capacitance oscillator as a frequency divider. The output of divider 2, being accurately of 20 kc. frequency, is as before stated, fed to the control grid of mixer 17.

Mixer 17 secures its B power through resistor 143 shunted by a ¼-watt neon lamp 141 and protective resistor 142. When the frequency supplied by the standard 20 kc. frequency to the control grid and that supplied by oscillator 4 to the suppressor grid are the same, the B current will be constant and the neon lamp will not glow. But if the two 20 kc. supplies are somewhat out of synchronism the two will be in phase at one instant and out of phase at another instant, thus causing the neon lamp to glow at the beat rate. By adjustment of the oscillating circuit of oscillator 4 its output may be exactly synchronized with that of crystal oscillator 1.

Buffer 18 thus will have consequent upon the above adjustment an accurate 20 kc. output. It supplies the fundamental timing reference frequency to the pulse-counting chain, the outputs of which control and time all operations in synchronization and time display 72, Fig. 5. Buffer 18 also supplies 20 kc. through lead 132 to the phase-shifting bridge 30. (Fig. 12) to be described later.

Returning to Fig. 5, oscillator assembly 74 supplies 20 kc. alternating current to pulse-counting chain 76. This chain reduces the 20,000 cycle input frequency to lower output frequencies, and transforms the sinusoidal input to pulse or square wave outputs. It does this in five stages, supplying intermediate pulse frequencies from two of the intermediate stages. The next-to-last stage and the last stage each supply any one of three frequencies as controlled by the position of the basic repetition rate switch.

The stages of the pulse-counting chain are pulse-counters rather than frequency dividers. They are so constructed as to be responsive to individual pulses of potential rather than to be frequency-responsive. Each stage is designed to absorb and to store within itself a prescribed number of pulses and to fire on a particular pulse, passing its output to the next stage and resetting itself. The frequency, intensity and wave shape of actuating pulses are of little importance within considerable limits, operation of stages being effected by reception of the designed number of pulses.

Figure 8:
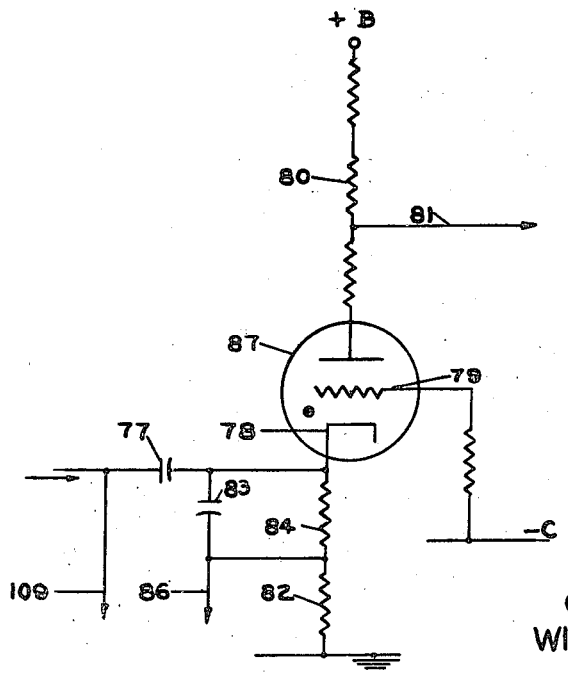

The five stages are shown in Fig. 7. At three places in the chain, trigger or pip-generating circuits are employed to produce short, sharp pulses of voltage for exciting the following stage and for timing purposes elsewhere within the timer. The first of these circuits, 19, is for the purpose of producing from the 20 kc. output or buffer 18 a short, sharp negative pulse, or pip as input to pulse-counter 20, the first stage of the chain, and also for supplying through lead 108 pips at intervals of 50 μs to injector 33, to be described later. It utilizes the well-known blocking oscillator circuit, described by Ridenour, supra, page 502. The second and third pip-generating circuits, 24 and 29, employ gas tubes. A schematic diagram of the circuit of pip generator 24 is shown in Fig. 8. Gas tube 87 receives its initiating pulse in the form of a strong negative wave with a very steep front from pulse-counter 22, through coupling condenser 77. This momentarily makes cathode 78 highly negative with respect to grid 79, firing the tube. This produces a sudden but quickly dissipated negative pulse at lead 81 in the plate circuit, which pulse is utilized to initiate pedestal delay circuit 36 and trigger selector 38, both to be described later. Simultaneously, the voltage drop in cathode resistor 82 is transmitted as a positive 500 μs terminating pip through lead 86 to coarse timing circuit 39, to be described later. Condenser 83 effectively short-circuits resistor 84 for pulses, intensifying the positive peak of the pulse transmitted through lead 86. The tube in firing draws upon energy stored in distributed capacitances. When this energy has been substantially used up, the discharge is extinguished, resistor 80 being large enough that the current through it will not support the discharge.

The same negative impulse from 5-pulse counter 22 which fires pip generator 24 also through lead 109 fires 5-pulse counter 25, Fig. 7, the next link in the counting chain.

Figure 9:
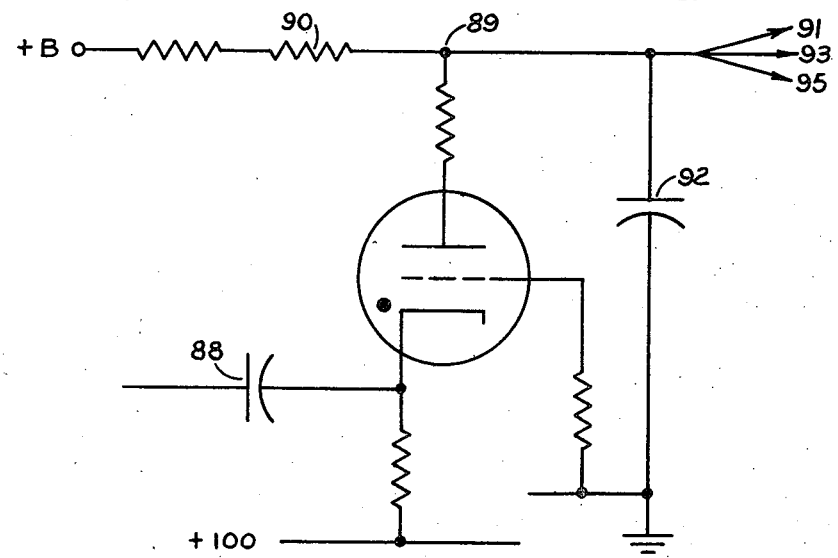

Pip-generator 29 employs the gas tube circuit shown in Fig. 9. Normally the cathode is at +100 volts while the control grid is at ground potential. A strong negative pulse from pulse-counter 27 through condenser 88 drives the cathode potential downward to the point where the tube fires. The resulting negative pulse from plate junction 89 goes through lead 91 to 2-pulse counter 12, Fig. 7, and through lead 95 to sweep generator 14, to be described later. The output also goes through lead 93 to pedestal delay 36, to be described later. Condenser 92 increases the width and energy of the pulse and retards its decay. When the energy stored in condenser 92 has been substantially used up, the discharge stops as the resistance of resistor 90 is too high to support discharge.

Figure 10:
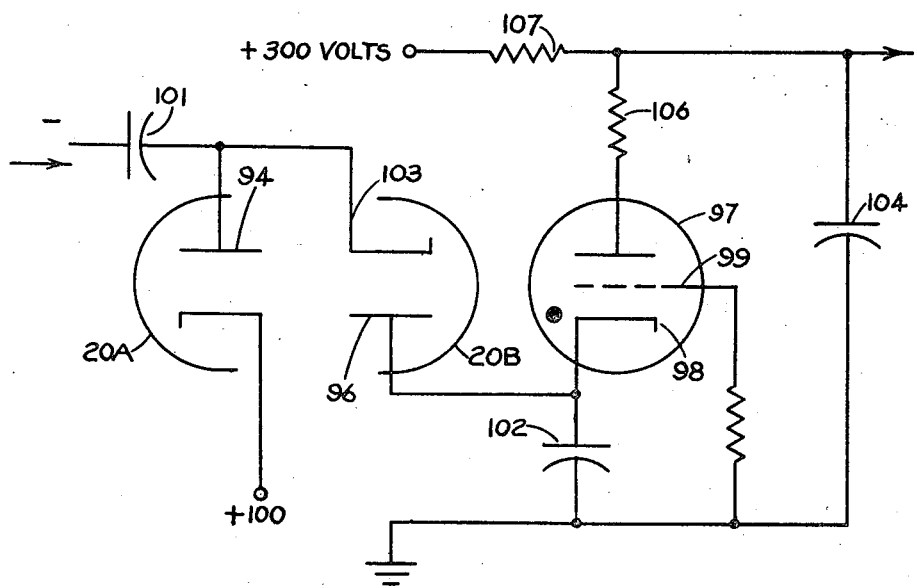

Pulse-counters 20, 22, 25 and 27 are in general similar to each other. Each employs a duo-diode and a gas tube as shown in Fig. 10. This circuit has the advantages that within reasonable limits its accuracy of counting is independent of the frequency of the incoming triggers, and is practically independent of fluctuations in voltages supplied to tube plates and cathodes if the incoming trigger is supplied by a similar circuit. When quiescent, the anode 94 of tube 20A, anode 96 of tube 20B and cathode 98 of tube 97 are all at approximately +100 volts potential. Control grid 99 is at ground potential and no tube currents flow. A strong negative pulse charging coupling condenser 101 goes through tube 20B to condenser 102, the charge of condenser 101 thereby being shared with condenser 102 and the potential of cathode 98 being brought to that of the initial pulse times the ratio of condenser 101 capacitance to the sum of the two capacitances, or $$E_k = E_t \frac{C_{101}}{C_{101} + C_{102}}$$

Where $E_k$ is the potential of cathode 98
$E_t$ is the potential of the strong negative pulse which charges condenser 101
$C_{101}$ is the capacitance of condenser 101
$C_{102}$ is the capacitance of condenser 102

This potential assumed by cathode 98 is therefore definitely determined by the capacities of condensers 101 and 102 and by the input pulse potential, and the firing of the tube is determined by the cathode and grid potentials. If this pulse-counting stage is adjusted to count two pulses, the first pulse will not make cathode 98 negative enough to fire the tube. The succeeding input pulse will again charge condenser 101 which will again share its charge with condenser 102. In doing so, however, the voltage through which the cathode 103 of tube 20B must fall before it reaches the voltage of cathode 98 of tube 97 must be subtracted from $E_t$, the trigger voltage. This results in decreases in the amplitudes of successive negative charges added to cathode 98. However, if adjusted as premised, gas tube 97 fires on the second pulse, suddenly increasing its cathode potential to approximately +100 volts in the following manner. Condenser 104 before firing is charged to +300 volts. Upon firing it must instantly share its charge with condenser 102. But since the size of the latter is made approximately twice that of condenser 104, the potential of condenser 102 must rise to approximately half that of condenser 104, resulting in a 100-volt charge on the condenser 102 and a 200-volt charge on the condenser 104. That is, $V=Q/C$, or voltage is inversely proportional to capacitance, where V is the voltage across a condenser with capacitance C, resulting from the imposition upon the condenser of a quantity of electricity Q.

It is obvious that anode 94 cannot ever retain a potential substantially greater than +100 volts, for any potential materially in excess of 100 volts of either cathode 98 or anode 94 would result in a discharge through tube 20A to a level of approximately +100 volts, which insures that the quiescent potential from which cathode 98 starts to count shall never be more than approximately 100 volts. Resistor 106 limits the peak current flow through gas tube 97 to preserve it from destruction by momentary high-current condenser discharges. Resistor 107 has a resistance so high that the current which may be drawn through it by the fired gas tube will not support discharge. Consequently, when the fired tube has substantially exhausted the energy stored in condenser 104 its discharge ceases.

Pulse-counting stage 27 differs from stages 20, 22 and 25 as just described only in that it may be switched so that the interval between output pulses is 15,000, 20,000 or 25,000 $\mu s$. This is done by switching a grid bias potentiometer so that the stage will fire on the 6th, 8th or 10th pulse respectively. This stage, in addition to actuating trigger 29, also sends pulses through lead 119 to injector 33 to be described later.

Two-pulse counter 12 in Fig. 7 consists of a multivibrator of the type commonly called scale-of-two, which operates to produce a half-cycle square wave when initiated by a negative pulse, and terminates said half-cycle and also commences the opposite-sense half-cycle when actuated by a succeeding negative pulse, maintaining the duration of said opposite-sense half-cycle until the next initiating negative pulse, and so on indefinitely. Such a circuit is described by Ridenour, supra, page 499.

This last pulse-counter stage 12 is followed by two cathode follower amplifiers 11 and 13, to avoid excessive loading of stage 12. These both amplify the square-wave output of counter 12, but in opposite phase. Such a cathode follower amplifier is described by Ridenour, supra, page 494.

The outputs of stage 12 and of cathode follower amplifiers 11 and 13 are 33⅓, 25 and 20 cycles, or half the frequency of the preceding 6, 8, 10 pulse-counting stage, and twice the period, or 30,000; 40,000 and 50,000 $\mu s$. These are the basic periods of the timer. During each basic period the cathode ray makes two visible sweeps, called the A sweep and B sweep. During the half cycle in which A sweep occurs, amplifier 11 output is zero volts, and during the B sweep it is nearly +300 volts. Amplifier 13 output is the reverse of this. During A sweep it is nearly +300 volts and during B sweep it is zero volts. The output of amplifier 11 goes through lead 111 to the vertical plates of the cathode ray tube for trace separation, through lead 112 to pedestal generator trigger circuit 44 to be discharged later, through lead 113 to trigger selector circuit 38 to be described later and through lead 114 to the automatic signal synchronization maintenance circuit 73 to be described later.

Figure 11:
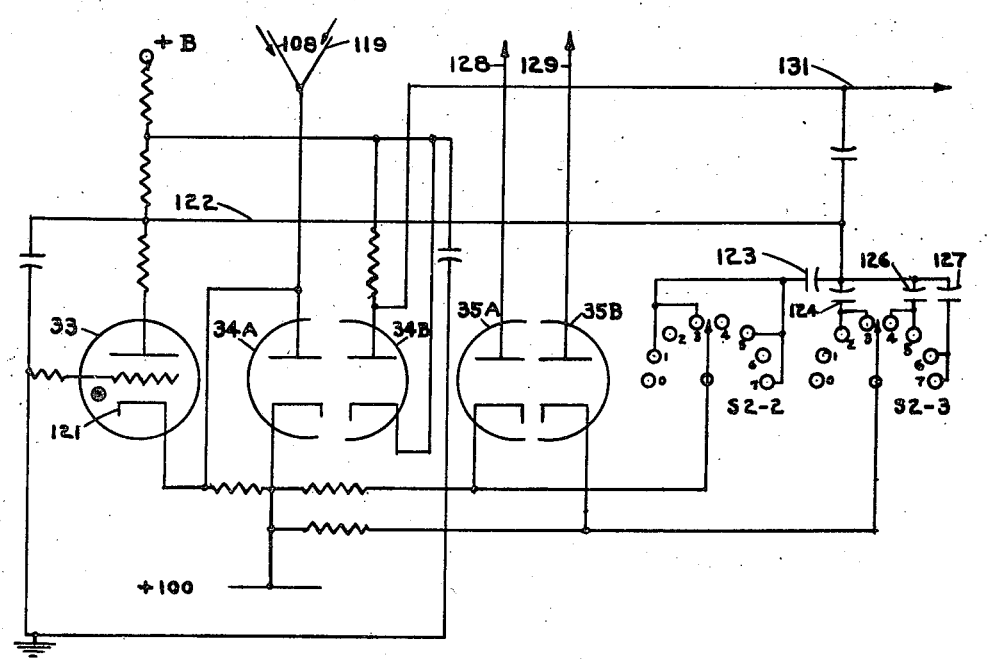
Figure 15A:
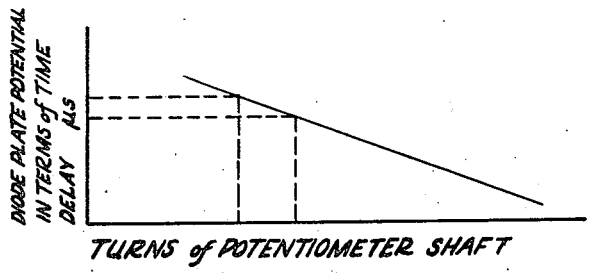
Figures 15A, 15B, 15C and 15D show graphically time-potential relationships in the fine delay unit.
Figure 15B:
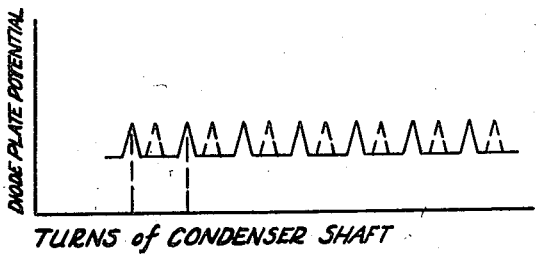
Figure 15C:
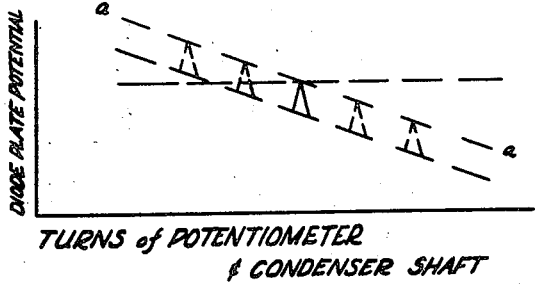
Figure 15D:
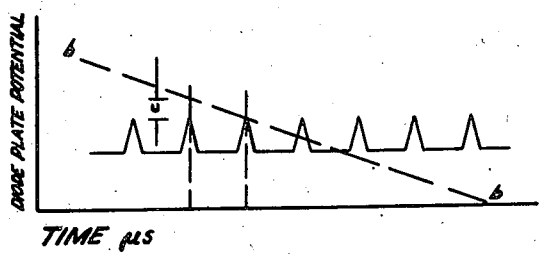
Figure 15E:
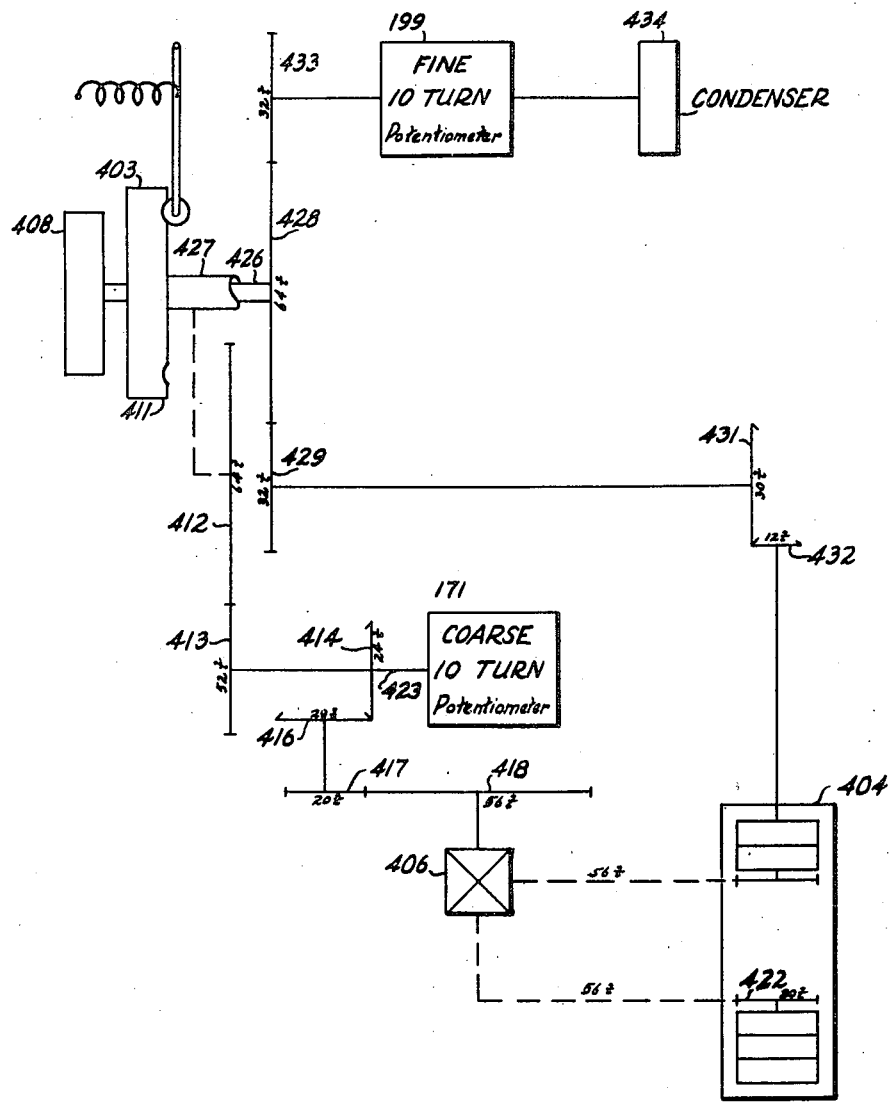
Figure 15E shows schematically the mechanical arrangement of the counter.
Figure 15F:
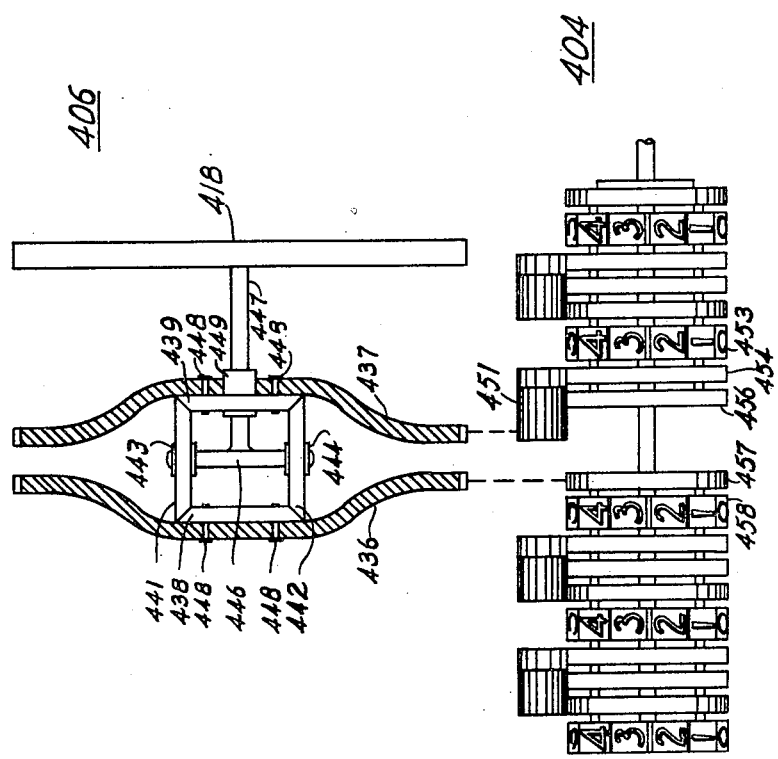
Figure 15F illustrates the physical relations of the differential and counter.

Injector 33 is an auxiliary of the counting chain. Its function is to reduce the sweep period in 50 $\mu s$ steps in accordance with the adjustment of the 8-point station selector switch. It also blanks out the trace at the start of the slow sweeps. In Fig. 11, the injector circuit is shown schematically. Two wafers of switch S2 are shown, with points marked in "station numbers" from 0 to 7. The sweep period is controlled by their setting and is the basic period minus 50 N $\mu s$ where N is the station number. As the pulse-counting chain operates, 50 $\mu s$ negative pulses from blocking oscillator 19 enter the injector through lead 108, and basic sweep period negative pulses of 15,000, 20,000 or 25,000 $\mu s$ enter the injector from pulse counter 27 through lead 119 (see Fig. 7). Each latter pulse reduces the potential of cathode 121 but not enough to cause tube 33 to fire. However, in combination with a negative pulse 50 $\mu s$ later through lead 108 tube 33 does fire, producing a strong negative pulse through lead 122 to switches S2—2 and S2—3 and condensers 123, 124, 126 and 127, and through a combination of them to the cathodes of either or both of the 100 $\mu s$ and 500 $\mu s$ stages 20 and 22 via diodes 35A and 35B and leads 128 and 129 respectively. The action of the pulse on pulse-counters 20 and 22 is additive as in regular counter action, and reduces by one the number of pulses from 50 $\mu s$ oscillator 19 necessary to cause pulse-counter 20 to fire when the station number is odd, and reduces by 1, 2 or 3 the number of pulses from stage 20 necessary to cause counter 22 to fire when the station number is 2 or 3, 4 or 5, 6 or 7, respectively. A negative pulse through lead 131 to the control grid of the cathode ray tube renders this tube inoperative for about 1000 $\mu s$ at the start of each A and B slow trace.

In Fig. 5 pedestal generator assembly 118 is shown to be actuated by pulse-counting chain 76 and as actuating synchronization and time display 72. The function of the pedestal generator assembly is to supply the cathode ray tube vertical plates with increased potential at definite times and for definite periods so as to produce raised platforms or pedestals over part or all of the screen trace. The pedestals on the A trace are different from those on the B trace and are different on the slow, intermediate, and fast sweeps. The pedestal generator itself, consists of only one tube but with it are associated several other circuits. All these together are referred to as pedestal generator assembly 118 and are shown in greater detail in Fig. 12.

The pedestal generator assembly, Fig. 12, consists principally of four time-interval generating circuits; the pedestal delay generator, the adjustable coarse delay circuit, the adjustable fine delay circuit and the pedestal generator. A phase-shifting circuit is auxiliary to the fine delay circuit. Three mechanical connections to a separate time display when used are indicated in Fig. 12 by dashed lines 100, 105 and 115; these connections will be more fully described later in connection with the description of the time display.

Figure 13:
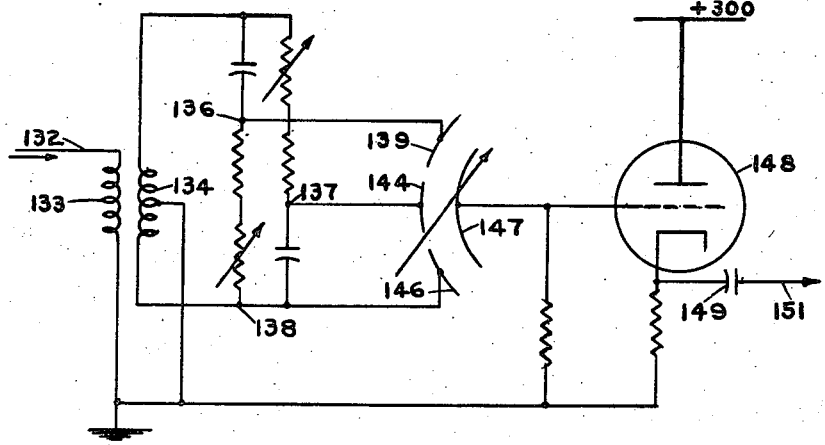

Phase shifting bridge 30, Fig. 12, is shown schematically in Fig. 13. It receives 20 kc. energy through lead 132, Figs. 6 and 13, from the cathode of buffer-cathode follower amplifier 18. This energy in transformer primary 133 appears at the two end terminals of secondary 134 as two potentials 180 electrical degrees apart. Therefore, potentials tapped from points 136 and 137 of their respective bridge networks can be adjusted to intermediate phase relations of +120 and −120 electrical degrees compared with point 138, producing three potentials 120 electrical degrees apart on condenser stator plates 139, 144 and 146. These plates are arranged 120 mechanical degrees apart also, so that rotation of rotor 147 results in the appearance on it of 20 kc. potential of continuously changing phase with electrical and mechanical phase displacements equal. This potential is fed to the grid of triode 148 through a short lead to protect from stray capacitances, and the cathode output is delivered through blocking condenser 149 and lead 151 to phase-shifted amplifier 31, Fig. 12, which may be a conventional pentode amplifier. The positive half-cycles from the plate of phase-shifted amplifier 31 actuate blocking oscillator pip generator 32, the positive plate pips of which through lead 152 terminate the action of fine delay 42, and cooperate therewith in a manner to be described later. Rotor 147, Fig. 13, is rotated by the manually operated knob of fine delay 42, Fig. 12, and also is connected through dashed line 100 to a separate time display if used.

The remainder of the pedestal generator assembly circuits are shown schematically in Fig. 14. The pedestal delay generator 36 includes tubes 152 and 37. Its function is to produce or mark off two time intervals, of exactly 1500 μs and 500 μs. The first interval is used to delay the start of the A pedestal by 1500 μs and the second to delay the start of the coarse delay gate by 500 μs. The circuit is the multivibrator flip-flop with a return time constant dependent on the sizes of capacitance 153 and resistance 154, made to be approximately 1500 μs. Initially tube 37 is conducting. The start of the A trace is initiated by a negative pulse through lead 93 from pip-generator 29, Fig. 7, at the start of, say, a 20,000 μs half period. Such a pulse renders tube 37 non-conducting, thereby initiating a flow of current through tube 152. Five hundred microseconds later a negative pulse from 500 μs pip-generator 24 entering through lead 81, switch S2—1 and screen grid 157 of tube 152, is amplified by the latter and the resulting positive pulse is stored in condenser 153. This correspondingly elevates the potential of grid 158, but not to the point of making tube 37 conductive. The next 500 μs pip elevates the potential further and the third brings grid 158 above cut-off, bringing the multivibrator back to its original condition with tube 37 conducting and tube 152 non-conducting. The termination of this 1500 μs period is therefore marked by a negative pulse at the plate of tube 37, which makes cathode 160 of tube 44B negative and initiates the A pedestal as follows, lead 112 from amplifier 11 carrying zero volts at this time. The negative pulse energizes tube 44B, passes through capacitance 159 to grid 161, stopping current through tube 45A, producing a positive pulse in plate lead 162 to the positive vertical plate of the cathode ray tube and thus suddenly elevating the trace and producing therein a platform or pedestal. This elevation is maintained until tubes 45A and 45B, constituting another multivibrator flip-flop circuit, return to normal, after a time depending on the time constants of the resistance capacity circuit including resistance 163 and capacitances 164 and 166, and being 1000 μs on slow and intermediate trace and 200 μs on fast trace.

Returning to the pedestal delay generator at the start of the described A trace, zero volts was placed on the suppressor grid 156 of trigger tube 38′ through lead 113 from amplifier 11, Fig. 7, preventing this tube from passing current even when its cathode was made strongly negative by 500 μs pips from lead 81. However, at the start of a B trace +300 volts is placed on suppressor 156 through lead 113 and during the first 500 μs +300 volts is placed on control grid 169 because it is connected through resistor 170 to plate 175. Therefore, the multivibrator having started as above described for A trace operation, the next following negative 500 μs pip from lead 81 passes to cathode 155 and makes tube 38 conduct current. Its plate therefore, produces a negative pulse which makes cathode 167 of tube 39A negative, starting the phantastron action of coarse delay 39 to be described later. The phantastron action results in a negative pulse on cathode 168 of pentode 40 which lowers the potential of suppressor 165 of tube 152, this restoring the multivibrator to its initial condition after 500 μs. Although this restoration of the multivibrator sends a negative pulse to cathode 160 of diode 44B just as during the A trace, it does not pass through the diode because during the B trace lead 112 from amplifier 11 puts this cathode at +300 volts. Thus the initiation of a pedestal by the pedestal delay generator 36 during the B trace is prevented.

Coarse delay 39, Fig. 12 includes tubes 39A, 39B and 40, Fig. 14. Diodes 39A and 39B feed pentode 40, which with fine delay trigger triode 41′ constitutes a modified phantastron circuit, being different from the usual phantastron circuit in starting from a fixed potential and terminating at an adjustable potential. This modified phantastron circuit is a flip-flop device for the accurate measurement of time. It is adjustable over a suitable range in 500-μs steps. The operation of this coarse delay is initiated at the beginning of each B trace by a negative pulse on cathode 167 of tube 39A. Its action is terminated by the cooperative action of potential drawn from potentiometer 171 and 500-μs positive pips from 500 μs pip generator 24 through lead 86. The termination of coarse delay action initiates the action of the fine delay circuit.

Operation of this modified phantastron circuit serving as an adjustable coarse delay is as follows:

When the circuit is not in action a small current flows through diode 39A but none flows through diode 39B. The potential on cathode 168 of pentode 40 is somewhat more positive than that on suppressor grid 172 due to a considerable screen current flow and corresponding cathode drop in resistor 181, therefore no plate current flows. Control grid 179 has a small current flow. Triode 41′ has a small plate current flow.

When action is initiated by applying a negative pulse, caused by firing trigger tube 38, to the cathode 167 of diode 39A, this pulse passes through the diode 39A and capacitance 174 to control grid 179, stopping all cathode-to-screen current and eliminating the potential drop in the cathode resistor 181. The cathode 168 therefore falls to zero potential and becomes less than the potential of the suppressor grid. Consequently, suppressor potential now being positive with respect to the cathode, plate-cathode current starts. This is immediately augmented by two feedback actions. First, the sudden drop in plate potential caused by plate resistor current flow passes through condenser 174 to the control grid, augmenting its negative pulse. Second, the sudden potential change in cathode resistor 181 caused by cessation of screen current flow produces a negative pulse through condenser 176 to control grid 185 of tube 41', suddenly stopping its plate current flow and increasing its plate potential. The positive plate pulse thus produced goes through condenser 177 to suppressor 172, tending further to increase plate current flow in pentode 40. This plate current flow by these two regenerative actions speedily comes to its maximum permitted by the potential attained by control grid 179, and can thereafter increase only as this grid potential may increase, which it now does under control of resistance capacity timing circuit consisting of capacitance 174 and resistance 178. The increase would be exponential if the plate potential were constant, but as the plate potential under this condition falls, the net result is, with proper circuit values, that the potential of grid 179 rises directly proportionally to time and the potential of plate 180 falls directly proportionally to time. This continues until terminated as follows:

The potential of plate 180 is communicated to connected cathode 182 of diode 39B, and is during the action higher than the potential of plate 183. The latter potential is that produced by manual adjustment of potentiometer 171 plus the value at 500 μs intervals of the peaks of 500 μs pips from pip generator 24 introduced through lead 86 and condenser 184 to plate 183. As the potential of pentode plate 180 and diode cathode 182 falls, the time will come when it will fall below the peak potential appearing on plate 183 every 500 μs, and will be enough below for diode 39B to pass current. The resulting positive pip will pass through capacitance 174 to control grid 179, increasing the cathode resistor current, producing a positive pulse through capacitance 176 to grid 185, resulting in an increase of tube 41' plate current, a decrease of plate voltage and a negative pulse through condenser 177 to suppressor grid 172 of pentode 40. This stops all plate current flow in tube 40, terminates the action, and restores initial conditions. The duration of the action of the coarse control is therefore an integral multiple of 500 μs, and is adjustable by manual variation of potentiometer 171. This potentiometer may also be connected mechanically to a separate time display, when used, and shown by dashed line 105, Fig. 12. Zero time potential is adjusted through resistors 190 and 184', and the potential slope is adjusted through resistors 186 and 187.

The output of the coarse control initiates action of the fine control as follows: In termination of coarse control action a negative pulse appears on the plate of triode 41' as just mentioned. This pulse passing to suppressor 172 and stopping tube 40 plate current, causes a large increase of potential at plate 180. This passes through capacitance 174 to grid 179, augmenting the screen current and increasing the positive potential of cathode 168, producing a positive pulse through capacitance 176 to grid 185 of tube 41' and greatly augmenting the negative pulse on its plate. This augmented negative pulse passes through capacitance 188 to cathode 189 of diode 42A of the fine control, thus initiating its action.

The fine control consists of pentode tube 43, fed through diodes 42A and 42B. When the circuit is not in action a small current flows through diode 42A, none through diode 42B. Current flows through the circuit including the screen 192. A slight current also flows through the circuit of the control grid 193. Cathode 194 is more positive than suppressor 196, preventing any current flow from plate 191. A strong negative pulse at cathode 189 of the diode 42A starts action by passing through capacitance 197 to grid 193, tending to stop screen current and lowering cathode 194 potential sufficiently for plate current to start, augmenting the negative pulse through capacitance 197 and thus regeneratively quickly bringing grid 193 to its lowest potential. Now further increase of plate current can be produced only by increase in the potential of grid 193 which occurs under control of the resistance capacity circuit consisting of capacitance 197 and resistance 198. Increase of plate current and the corresponding decrease of potential of plate 191 now proceed directly proportionally to time until terminated as follows: Plate 201 of diode 42B is, during the action, at lower potential than cathode 202. The potential of plate 201 is the sum of the static potential depending on the manual adjustment of potentiometer 199 and of the potential of 50 μs pips received through lead 152 and condenser 203 from pip generator 32, Fig. 12. Potentiometer 199 also is mechanically connected to the separate time display, when used, as shown by dashed line 115, Fig. 12. When the potential of cathode 202 has fallen sufficiently near to that of plate 201, in the course of the phantastron action, the next positive 50 μs pip flows through diode 42B, through capacitance 197 to grid 193, causing an increase of cathode current and an increase of cathode potential to above that of suppressor 196, stopping all plate current.

The adjustment of the fine delay is continuous and not intermittent, as shown in Fig. 15, A, B, C and D. The phase-changing condenser rotor 147, Fig. 13, changes phase 360 electrical degrees during 360 mechanical degrees of rotation. It is mechanically connected to the shaft of ten-turn potentiometer 199, Fig. 14, which is adjusted so that one turn changes the termination of fine delay phantastron action by exactly 50 μs, as shown in Figs. 15A and 15B. As a result, in Fig. 15C, the peak of any particular pip moves smoothly and continuously along the slanting line a—a as the shaft is rotated, successive positions 360 degrees apart being indicated by dotted pips. At any one particular adjustment, as shown in Fig. 15D, at time t one of the pips just reaches the necessary potential bb to pass through diode 42B and terminate the action. The use of the 50 μs pips makes the terminating action positive, as in Fig. 15D the preceding pip is insufficient by the value c and the succeeding pip is more than enough by the same amount.

Termination of fine phantastron action initiates the B trace pedestal action by production of a negative pulse at screen 192. This is differentiated and thus sharpened in the differentiating network consisting of capacitance 204 and resistance 206. The resulting negative pip passes through diode 44A and capacitance 159 to control grid 161, stopping current flow through tube 45A and thus initiating the pedestal. Thus the B trace pedestal is initiated at a time 500 μs plus the coarse delay time plus the fine delay time after initiation by a pulse from pulse-counter 27, Fig. 7.

Recurring to Fig. 12, dashed lines 100, 105 and 115 represent mechanical connections to a separate time display, if used. Although the time interval in microseconds may be displayed on the reen and measured thereon
simultaneously displayed, it
ustration to display the time
it separately.
; shown in Fig. 15E. Coarse
rries a 45° detent 411 and
; 427 actuates spur gear 412,
413, 414, 416, 417 and 418 ro-
ifferential 406, and through
iter 404, gear 422 of the hun-
lso knob 403 through gears
it 423 rotates coarse 10-turn
ilso shown in Fig. 14. For
control knob 403, gear 422
undreds dial rotate 4 turns,
indication by 4000 units or
for one turn of the knob
171 makes two turns.
408 is concentric with knob
shaft 426 is carried through
w shaft 427 to gear 428.
131 and 432 the fine control
its dial of counter 404, and
id 433 the same knob actu-
ter 199, also shown in Fig.
he 50 μs phase-shifting con-
g. 13. Therefore, for each
trol knob the units dial of
0 turns, or 100 units or mi-
the fine potentiometer and
two turns.
d counter 404 are shown in
15F. The differential con-
iur gears 436 and 437, each
ear, 438 and 439 by means
rears 441 and 442 mesh with
ind their hubs are carried
and 444 by spider 446, which
I through bearing 449 rotat-
irs 437 and 439. Shaft 447
h is rotated by the coarse
etofore described. Dished
ies with idler pinion 451
ie mechanical counter 404.
r tens dial 453 of the counter
454 and intermittent pinion
lriving hundreds dial 458 is
dished spur gear 436. Thus
igh the successive stages of
units dial to the ten thou-
ed between the tens and the
it the tens dial drives the
tly through the differential combined differential and
If the fine control knob 424,
noperated and the coarse
, 15E be operated, gear 418,
l, since dished spur gear 437
er 451 to locking gear 454
ncapable of rotation, there-
nunicated to spider 446 by
ed in rotating dished spur
obvious that spur gear 436
h revolution of spider 446.
mitted to meshed gear 457,
dial and through it in the
; thousands and ten thou-
owever, the coarse control
ated and the fine control
inits dial is rotated through
d, rotating the tens dial.
; from a showing of digit 9
t 0, idler 451 is advanced,
gear 437. Spider 446 being effectively locked by the friction of the un-
operated coarse control gear train, the motion
of dished spur gear 437 is transmitted through
the differential in 1:1 ratio to dished spur gear
436, which actuates the hundreds dial by rotating
gear 457 as if it were directly acted upon by idler
451. It is obvious that simultaneous rotation of
the coarse and fine knobs will produce the same
results in advancing the counter as if each rota-
tion occurred separately. Thus the indication
of the counter at any time represents the sum of
the displacements of the two control knobs.

Returning to Fig. 5, the sweep generator 117,
actuated by pulse-counting chain 76 and pedestal
generator assembly 118, is shown as actuating
synchronization and time display 72. The sweep
generator's function is to sweep the cathode ray
horizontally to form the two visible A and B left-
to-right traces, and to snap the beam back quickly
and at lowered intensity in the invisible retrace
strokes. The generator does this by generating
saw-tooth voltages which are amplified in a
push-pull triode amplifier and applied to the
cathode ray tube horizontal plates. The sweep
generator 14 and amplifier 15 are shown sche-
matically in Fig. 16. The initiating negative
pulse on slow sweep comes through lead 95 from
pip generating circuit 29, Fig. 9. It produces a
positive pulse at the plate of tube 14, resulting
in a negative pulse at the plate of tube 15A and
at horizontal plate 218 of cathode ray tube 16. At
the same time the cathode resistor 207 starts
to carry more current, cathode 208 therefore be-
comes more positive and tube 15B current nearly
stops, producing a positive pulse at the plate
which goes to the other horizontal plate 219 of
tube 16. These two voltages produce the rapid
retrace of tube 16. Immediately condensers 209,
with 211, 212 and 213 if so switched, begin charg-
ing through resistors 214 and 216 and increasing
the potential of control grid 217 of tube 14, which
produces a slowly increasing positive charge at
horizontal plate 218 and a slowly increasing nega-
tive charge at horizontal plate 219 by reversal of
actions above-described. Exponential rate of
charge is modified by leakage through resistors
221 and 222 to a straight-line rate.

Figure 16:
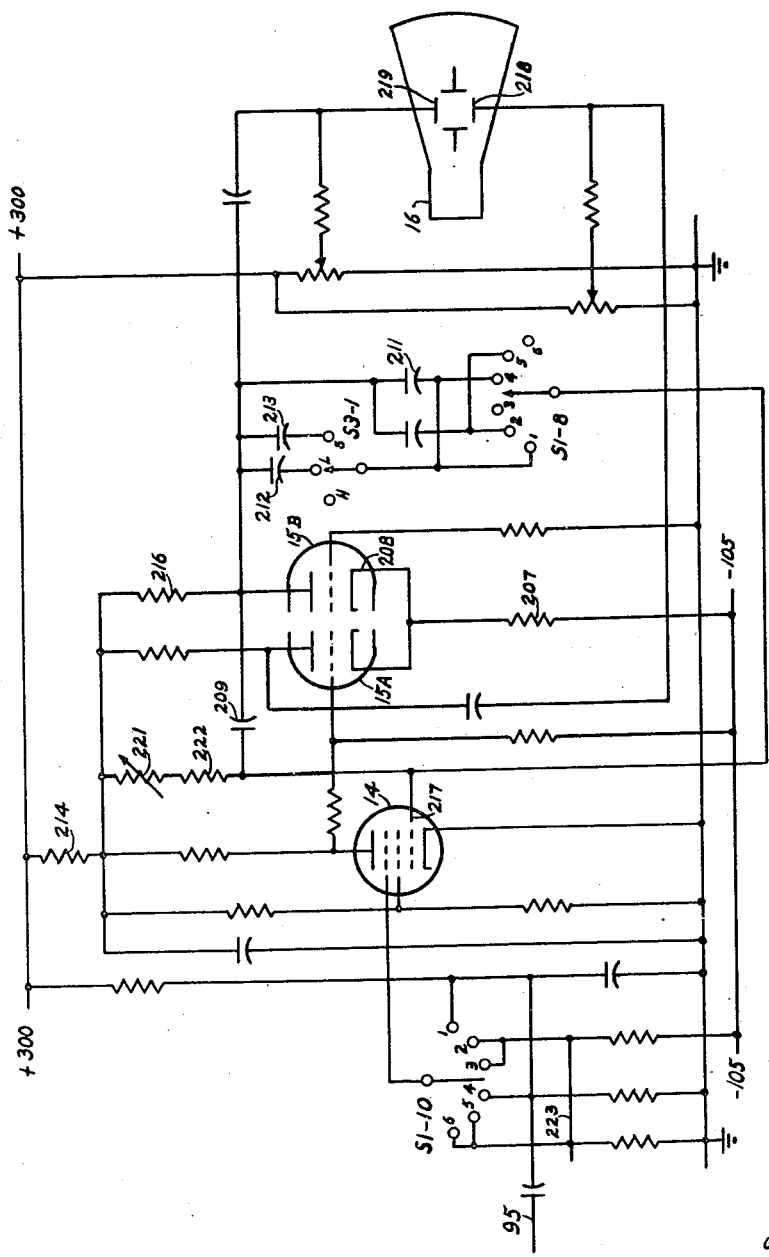

On intermediate and fast sweeps the initiating
pulse is received directly from the pedestal gener-
ator 45 through lead 223, Figs. 14 and 16, at the
time of initiation of the pedestral. This positive
pulse starts current through tube 14, reducing
current through tube 15A and starting a positive
charge flowing into tube 16 plate 218. Also, by
cathode follower interaction, plate 219 starts to
become more negative. The rate is again under
control of control grid 217 and the timing con-
densers and resistors. At termination of the
pedestal, generator 45 reverts to its initial state,
thus producing a negative pulse through lead 223
and causing retrace.

In receiving a Loran signal as shown in Fig. 1,
the receiver component 57 is tuned to the desired
wavelength by setting the channel switch, and
the timer 58 is adjusted to the desired basic pulse
rate and station number. The desired Loran
signal should then appear as the most slowly
moving of all signals visible on synchronization
display 59; its motion may then be stopped and
its position corrected by manual adjustment.
This adjustment has heretofore neither been
particularly easy because of the accuracy re-
quired, nor has the signal remained stationary,
so that frequency readjustment has been required.
In order to facilitate this adjustment variable velocity signal phase shifter 116, Fig. 5, is provided in this invention and in order to eliminate necessity for any readjustment, signal synchronization maintenance circuit 73, Fig. 5, is additionally provided. The latter also eliminates the necessity for excessively fine initial adjustment of the local frequency or phase. It locks the frequency of the Loran receiving station timer to that of the sending station, and has the visual effect on the cathode ray tube screen of seeming rigidly to fix or lock the visible signal of the master station in a stationary position near the left end of the A trace.

The automatic signal synchronization maintenance circuit 73 is shown in somewhat greater detail in Fig. 17 for a general understanding of the functions of its parts. Two inputs at the left of Fig. 17 consist of the video signal through lead 227 from the receiver component, as shown in Figs. 1 and 5, and of a pulse representing the start in time of the pedestal generated by pulse generator 45B, led in through lead 224 (Fig. 14). This starting pulse initiates a trigger from gate trigger 8A, which initiates a 100 μs rectangular half-wave from "A" gate 9, the trailing edge of which initiates a second 100 μs rectangular half-wave from "B" gate 10. Each gate, during the 100 μs life of its output, energizes a coincidence tube which if simultaneously energized through paraphase amplifier 7 by the video signal, will charge capacitance 228. "A" coincidence tube will charge it positively and "B" coincidence tube will charge it negatively. Reactance tube 3 thereupon senses the amount and polarity of charge on capacitance 228 and changes the frequency of 20 kc. oscillator 74, the amount and direction of the change being proportional to the amount and sense of charge on capacitance 228.

Figure 18:
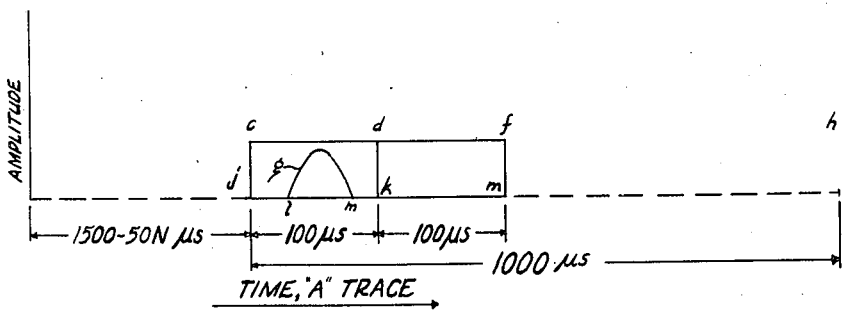
Figure 18 illustrates the operation of the automatic signal synchronization maintenance unit.

Fig. 18 illustrates time relations involved. Its appearance is what would be seen on the cathode ray tube screen in function switch position 2 if both 100 μs gates appeared thereon. Distance ch represents the 1000 μs. A trace pedestal occupying the full effective width of the screen. cd and df represent the first 200 μs of this trace, each 100 μs in length. The pulse g represents the video A signal, approximately 40 μs long and occurring once each repetition period. Although this signal may occur in any time relation with the other elements shown, it is here shown as occurring within the 100 μs period cd. This period is designated the "A" gate, and 100 μs period df is designated the "B" gate.

The function of the automatic signal synchronization maintenance circuit is to move the video signal from any point within the "A" or "B" gate to position d, the junction point in time and on the trace of the gates, and to keep it there. How this is done is described more in detail referring to Fig. 19.

Oscillator 4, referred to in connection with Fig. 6, is associated with inductance 226 and four capacitances effectively in parallel, of which fixed condenser 229 is the principal and largest. The function of variable condenser 231 is to stop the motion of the desired signal, as previously described. Control 232 is for use in connection with the variable velocity signal phase shifter, to be described later. Fixed condenser 233 in series with resistor 234 is effectively partly or wholly in parallel with the other condensers when permitted by reactance tube 3 in a manner to be described. The frequency of oscillation of oscillator 4, as transmitted to other parts of the timer through leads 132 and 236 depends on the magnitudes of inductance 226 and of the four capacitances in parallel. Among other functions this oscillator governs the cathode ray sweep rate, and the automatic signal synchronization maintenance circuit locks or fixes the desired signal on the cathode ray trace by governing this oscillator's frequency and hence the sweep rate.

Lead 227, Fig. 19, delivers 40 μs video signals from the receiver component (57, Fig. 1) to video clipper tube 8B. Each pulse or signal consists of the demodulated envelope of the radio frequency pulses received by the antenna from the transmitting station and may be visualized as being like g, Fig. 18. These positive pulses are passed by clipper 8B, the function of which is to bar all negative pulses. The passed pulses raise the potential of grid 269 of paraphase amplifier 7, which has a plate resistor 237 and a cathode resistor 238 of equal resistance. Therefore, the currents being the same in each when the grid goes positive, the potential drops are equal, and equal negative and positive pulses of opposite phase are simultaneously generated and simultaneously transmitted through capacitances 239 and 241 respectively to cathode 242 of "B" coincidence tube 6, and anode 243 of "A" coincidence tube 5. These charges persist as long as the video pulse lasts. However, the coincidence tubes will not conduct by the effect of the video pulse alone, because their grids are normally negative, that of tube 6 because it is tied to −105 volts through resistors 244 and 246, and that of tube 5 because its grid is made negative by the "A" gate generator switch S—4 being open to permit automatic signal synchronization maintenance. It requires the appearance of the above-described charges on plate and cathode, and the coincidental appearance of sufficient positive charges on these grids, for tubes 5 and 6 to pass current. The control of both grids is accomplished by the pedestal generator tube 45 and two multivibrator timers as follows:

Lead 224 from pedestal generator 45B, Fig. 14, carries a negative pulse, indicating the start in time of the pedestal, to cathode 247 of gate trigger tube 8A, Fig. 19, making this tube conduct. This occurs on the A trace only, because lead 114 from scale-of-two amplifier 11, Figs. 7 and 19, is positive by approximately 300 volts during the B trace, preventing cathode 247 from becoming negative. When tube 8A conducts, its plate resistor 248 thereby develops a potential drop, and a negative pulse appears at plate lead 249. This pulse stops current flow in normally conducting tube 9A, which with tube 9B constitutes a flip-flop multivibrator, the period of which is 100 μs being dependent on the sizes of capacitance 251 and resistance 248. At the termination of this 100 μs half-cycle tube 9A fires and a negative pulse is transmitted from plate 252 through capacitance 253 to grid 254 of tube 10A, which with tube 10B constitutes a second flip-flop multivibrator, also of 100 μs period, governed by capacitance 256 and resistance 257.

These two multivibrators thus generate two consecutive half-waves, of 100 μs duration each. The first in time is known as the "A" gate and the second as the "B" gate. The first gate is led from plate lead 252 through capacitance 258 and resistance 259 to grid 261 of "A" coincidence tube 5; the second is led from plate 262 through capacitance 263 and resistor 244 to grid 264 of "B" coincidence tube 6. These half-waves being of positive polarity, during their persistence the respective coincidence tubes are in condition to conduct. If in either coincidence tube the grid is positive while its plate is also positive, plate current will flow, but if only one element be positive, or neither, the tube will not conduct and no plate current will flow. This is clarified by Fig. 18. The time covered by video pulse *g* represents the time during which "A" coincidence tube 5 conducts. Within rectangle *cdkj* but outside of envelope *g* the "A" coincidence tube does not conduct, for although its grid is positive its plate is not. Therefore during intervals *jl* and *mk* the tube does not conduct. Since none of the video pulse is within "B" gate, between *d* and *f*, the "B" coincidence tube does not conduct at all. Looking now at storage condenser 228 connected to both coincidence tubes, it is seen that under the conditions depicted in Fig. 18 between *l* and *m*, a charge flows through tube 5 and from cathode 266 to condenser 228 and toward ground, charging the condenser's upper plate and the connected grid 267 of tube 3 positively and increasing its plate current. Conversely, if tube 6 should operate, a charge would flow from ground through storage condenser 228 and the grid of tube 3 would be negatively charged, decreasing its plate current. Normally, this grid 267 floats without connection to ground, but during operation when momentary charges are continually flowing through both coincidence tubes in varying proportion, the effect at the ungrounded plate of condenser 228 is of a continuously-varying direct current bias, impressed on grid 267 of the reactance tube, and thereby controlling and varying the latter's plate current in direct proportion.

Reactance tube 3 controls the frequency of 20 kc. oscillator 4 as follows: Grid 267 is fed a slight amount of 20 kc. power from tube 4 through buffer amplifier tube 18 and condenser 268. When tube 3 is conducting this appears as a voltage across the cathode resistor 234 and is therefore impressed on the connected plate of condenser 233. But this condenser also has the same frequency, in substantially the same phase relation, impressed on its other plate directly by the LC circuit, consisting of inductance 226 and condensers 229, 231 and 232 so that if the amounts of voltage are the same, both plates will rise and fall in charge together and this condenser will have no effect on the frequency of the oscillator; the condenser does no work and acts as if it were not in circuit and its leads were open. Conversely, when tube 3 is not conducting, condenser 233 is charged by the LC circuit only and adds to the capacitance thereof, resistance 234 being low enough that it has little effect on the effectiveness of condenser 233. Therefore when storage condenser 228 accumulates during a small interval of time more positive than negative charge, tube 3 conducts more and condenser 233 has less than average effect on the LC frequency, which therefore is higher than average. Conversely, when condenser 228 has a preponderance of negative charge, tube 3 conducts less and condenser 233 has more than average effect, reducing the frequency of the oscillating circuit.

This affects the cathode ray tube A trace as follows: If the 20 kc. frequency increases, the sweep generator frequency and the sweep frequency increase in frequency making it appear that the video pulse drifts toward the right on the cathode ray screen. Conversely, if the 20 kc. frequency decreases, the trace sweep repetition rate decreases, making it appear that the video pulse drifts toward the left. Thus if in Fig. 18 the pulse appears in the "A" gate, between *c* and *d*, condenser 228 is therefore charged positively, tube 3 conducts more current, condenser 233 has less effect, the oscillatory circuit frequency is increased, and the video pulse drifts toward the right and toward *d* in Fig. 18. Conversely, if the pulse is in the "B" gate it will drift toward the left and toward *d*. Having arrived at *d*, the pulse will be "locked" there by the same processes that brought it there. In operation the pulse appears to snap, not drift, to the center or *d* position, and remains there.

Thus the exact synchronization of the A video signal with a specified point on the cathode ray A trace, corresponding to a specific time of $(1500-50N)+100$ microseconds after the start of each A trace, is maintained automatically. This specified point on the trace and in time being taken as zero in measurement of the distance and time between the A and B video or received signals, eliminates the necessity of the operator's attention being given to maintaining this zero point, enabling him to give his entire attention to the actual measurement.

However, it is necessary for the operator to drift the A video signal to either the "A" or "B" gate depicted in Fig. 18, and until he shall have done this the automatic signal synchronization maintenance circuit will not come into operation. Heretofore, this drifting process has been either slow and time-consuming, or rapid and inaccurate. It has usually been done by a momentary contact switch which changes the 20 kc. oscillatory circuit frequency by a single definite and invariable increment which in many instances was either too fast or too slow.

If for example, a slow rate of drift was used the operation was time-consuming when the video signal had to be drifted a considerable distance, on the other hand when a fast rate of drift was used it was difficult to stop the video signal at the right section of the sweep.

These difficulties are avoided in the present system by providing an arrangement whereby the velocity of drift may be varied at the will of the operator. If the distance that the video signal must be drifted is large the drift may be made rapid at the beginning thereof and gradually slowed down as the signal approaches the relatively small desired section of trace, so that the automatic maintenance circuit may take hold and lock the signals in place. It is desirable to provide such an adjustment arrangement even when employing the automatic maintenance circuit, because if an invariable velocity of drift were used it might be found difficult to stop the drift at the right time. If the drift were stopped too soon the automatic maintenance circuit would not take control; if stopped too late the signal might drift past the desired spot before the automatic circuit could act to lock the sweep and signal in proper timed relation.

The variable velocity signal phase shifter provided in this invention is a facility for moving the video signal along the cathode ray trace with a speed that is under control by the operator. It can be used at any time, but is normally to be used when the equipment is set to slow sweep to bring the A received video signal onto its 1000 $\mu$s pedestal, as heretofore described in connection with Fig. 2, and also is to be used when the equipment is set to intermediate speed of sweep to bring the A received video signal within "B" gate 66, as heretofore described in connection with Fig. 3C.

The variable velocity signal phase shifter enables the user to drift the signal to the right or left without changing condenser 231 adjustment, after having stopped signal motion by adjustment of condenser 231. It also permits the user conveniently to control the rate of drift. After use of this control the rate of drift automatically returns to zero so that, as far as this control is concerned, the signal again becomes stationary at the new position on the sweep trace.

The variable velocity signal phase shifter control is a lever-type knob on the front of the equipment control panel, normally held by spring pressure in a vertical position with the lever pointing down. This lever may be moved by the operator through about 80° to the right or left against spring pressure which returns the lever to its normal median position when released. Movement of the lever to the left drifts the signal toward the left on the tube screen, and the rate of drift of the signal is in direct proportion to the amount that the lever is moved. If the lever is moved very little, the drift is very slow; if the lever is moved to its limit stop, the drift is fastest and its rate will be approximately 5000 µs per second, the exact value thereof depending on the particular repetition rate chosen. The lever is therefore not only a drift control, but is also a drift rate control.

In operation, after the recurrence rate and station number switches have been set and a video signal observed on the screen, the signal will generally be drifting to the right or left. Its motion is then stopped by adjustment of the oscillator frequency knob and its location may be anywhere on the trace. The oscillator frequency knob controls the adjustment of capacitance 231, Figs. 19 and 20. Let us assume that the signal then appears as at position 272 in Fig. 2. The next operation, that of moving the signal to the pedestal, with function switch set on function 1 (slow sweep), is by use of the variable velocity signal phase shifter facility. Assuming that the signal is to be moved to the left a distance of two inches, the control lever is moved toward the left the maximum amount, causing the signal to drift leftward rapidly. As the signal nears the pedestal 63, Fig. 2, the operator permits the control lever to return toward its median or zero position, and the closer the signal approaches the pedestal, the slower the operator permits the signal to move. When the signal reaches and mounts the pedestal, the operator releases the lever and the signal becomes stationary. Turning the function switch to position 2, this process is repeated if necessary to bring the signal into "B" gate 66, Fig. 3. When automatic signal synchronization maintenance is used (switch S—4, Fig. 19 at On) it is only necessary to bring the signal center within "B" gate 66, or within the "A" gate, after which the signal pip is seized by the automatic maintenance device, brought to the line d, Fig. 18, and kept there. But when the automatic signal synchronization maintenance device is not used (switch S—4, Fig. 19 at Off) it is necessary for the operator after having brought the signal pip within the desired space, jm, Fig. 18, to keep it there by continuous readjustment. This is best accomplished by very slight drift changes, and it is easy to do with the variable velocity signal phase shifter control, using very slight displacements of the control lever with correspondingly slow rates of drift of the signal. The manipulation of this rate lever is simple and effects control in a natural manner, analogous to that of an automobile accelerating pedal.

Figure 20:
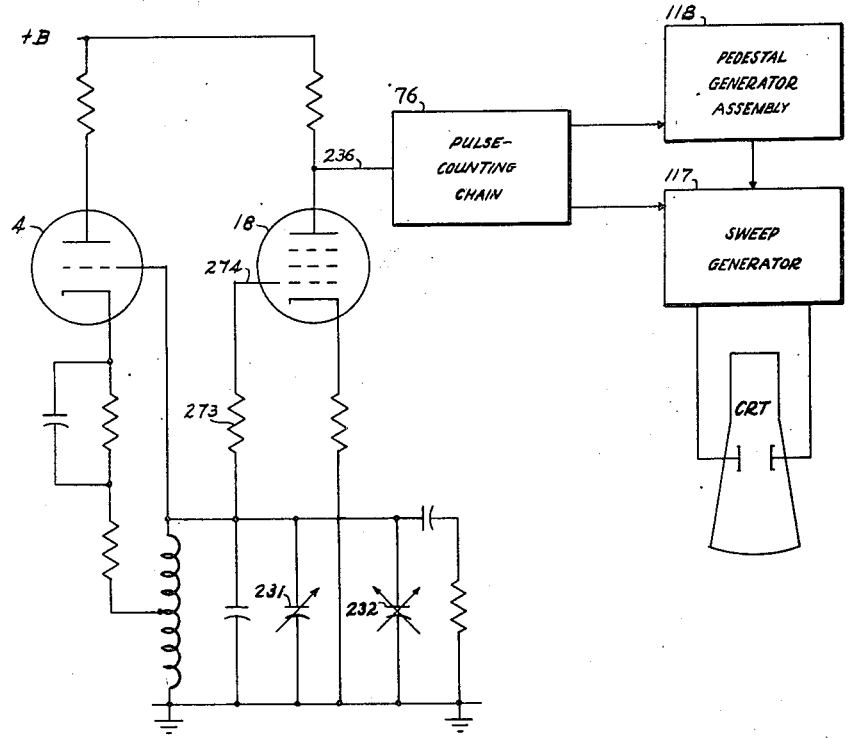

The electrical means controlled by the control lever to effect this adjustment are shown in Fig. 20. Twenty kilocycle oscillator 4 is tuned by several capacitances in parallel, one of which, 232, is controlled by the variable velocity signal phase shifter control lever. At the normal median position of the latter the capacitor is held at a mid-capacitance point. When the control lever is moved toward the operator's left, the capacitance is increased toward a maximum 80 µµf and when the control lever is moved toward the right the capacitance is decreased to a minimum 7 µµf. These changes from median position to maximum and to minimum have the effect on the oscillatory circuit shown in Fig. 20 of changing the frequency of oscillation by approximately ±100 cycles per second, decreasing the rate when the lever is moved toward the left and increasing the rate when moved toward the right.

These changes in frequency change the sweep recurrence rates as follows: A connection from one side of the oscillatory circuit is made through resistor 273 to control grid 274 of buffer amplifier pentode 18. The plate of the latter through lead 236 drives pulse-counting chain 76, which initiates the action and controls the rate of sweep generator 117 on slow sweep, and through pedestal generator assembly 118, initiates the action and controls the sweep repetition rate of sweep generator 117 on intermediate and fast sweeps. As the frequency of the 20 kc. oscillator is varied, the sweep repetition rate appearing on the cathode ray screen is correspondingly varied, thus changing the relative phase of the video signal, that is, changing the point of occurrence during the period of sweep. When through this change the video signal occurs in the desired position d, Fig. 18, it is in the desired time relation with the locally generated sweep, that is, it has been shifted to the desired phase relation.

Figure 21:
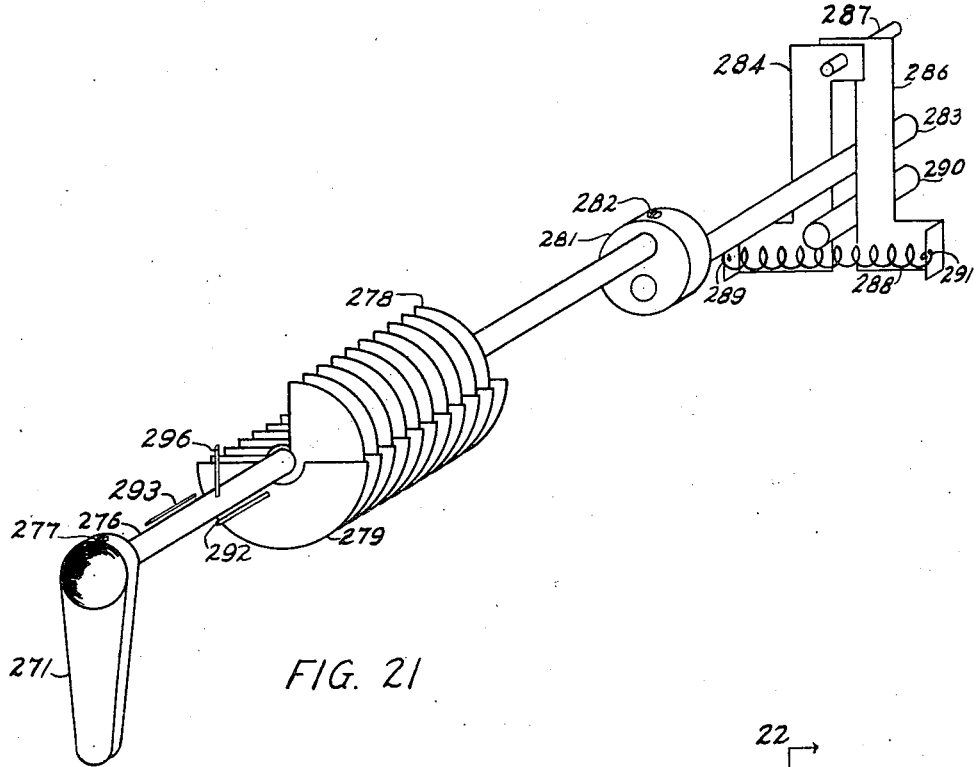
Figures 21, 22 and 23 illustrate the construction of the variable velocity signal phase shifter.
Figure 22:
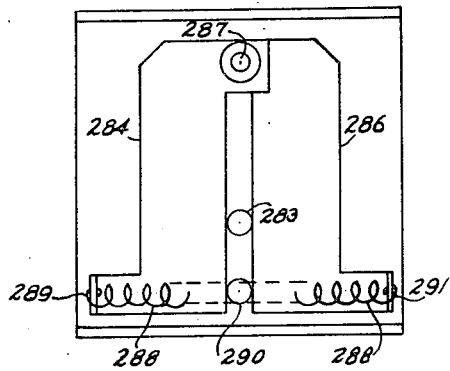
Figure 23:
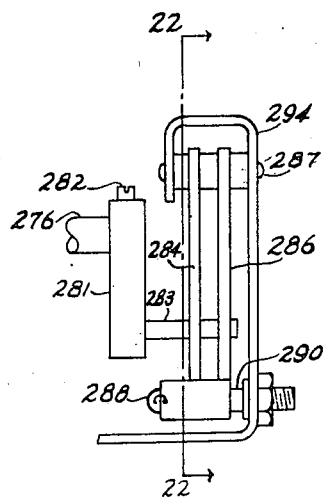

Mechanically, the variable velocity signal phase shifter makes use of mechanism illustrated in Figs. 21, 22 and 23. Lever 271 represents the control lever appearing on the face of the equipment control panel for use of the operator. This lever is locked to shaft 276 by set screw 277. Shaft 276 carries rotor 278 of an air dielectric rotary variable condenser consisting of a rotor and a stator 279. The rotor and stator each consist of a set of semicircular plane plates, both sets on a common geometric axis and the two sets interleaved but electrically insulated from each other. It will be understood that this type of condenser is described for the purpose of illustration, but that any other type of electrical condenser variable by the rotation of a shaft may be used instead. Shaft 276 also carries eccentric hub 281, locked thereto by set screw 282. Eccentric hub 281 bears a fixed pin 283 extending rearward parallel to shaft 276, so that rotation of the shaft will rotate fixed pin 283 through an arc. Bearing against pin 283 are left lever arm 284 and right lever arm 286, pivoted at a common axis on pin 287. Tension spring 288 hooked into holes 289 and 291 in the lever arms draws them toward each other to touch pin 283. Stop pin 290 fastened to the frame 294 of the device is of the same diameter as pin 283 and determines the unoperated position of the latter.

Maximum and minimum stop pins 292 and 293 limit rotation of shaft 276 to approximately ±80° by engagement with them of stop pin 296 carried by shaft 276. It is understood that the mechanical details of design of this device can be varied greatly without departing from its principles of operation, described as follows, and that this design is described in detail simply as illustration.

Normally control lever 271 points downward as shown in Fig. 21, condenser rotor plates 278 are half interleaved with stator plates 279, both left and right lever arms 284 and 286 are as close together as possible and are held touching and embracing stop pin 290 and pin 283 by the tension of spring 288. When lever 271 is moved to the operator's left, rotor plates 278 are moved to interleave more with stator plates 279, increasing the capacitance of the condenser formed by the two sets of plates, indicated as device 232 in Figs. 19 and 20. Also pin 283, rotating about shaft 276, forces left lever arm 284 toward the left, developing a reaction in spring 288 which must be overcome by the operator and which automatically restores the device to the normal position above described when the operator releases lever 271. Similarly, when the operator pushes lever 271 toward the right, the condenser capacitance is decreased, right lever arm 286 is forced toward the right and spring 288 reaction is again developed which will restore the device to its normal or median position upon release of lever 271 by the operator.

A relatively simple and economical arrangement is therefore provided which permits the rate of drift to be under control of the operator providing at one and the same time rapidity and accuracy of operation which has heretofore not been the case, one having to be sacrificed for the other.

What is claimed is:

1. In a long range navigation system wherein periodically recurring radio pulses are transmitted from A and B stations with precise and characteristic time intervals between like pulses and between each A-station pulse and the succeeding B-station pulse, a receiver for receiving said pulses, a cathode ray tube connected thereto for displaying said received pulses, a deflection circuit connected to said cathode ray tube, timing means variable in its frequency of operation connected to said deflection circuit for producing successive pairs of horizontal traces on said cathode ray tube screen the start of said traces being determined by the frequency of operation of said timing means, means connected to said timing means for adjustably and continuously varying the frequency of operation thereof whereby the rate of change of the start of said traces with respect to the times of recurrence of said A pulse may be varied, means connected with said timing means for automatically maintaining the start of said traces in exact synchronism with the times of recurrence of said A pulses when said starting time has been adjusted within a predetermined range by said means for adjustably and continuously varying the frequency of operation of said timing means, means for adjusting the start of the trace on which said B pulse appears to align said A and B pulses and means for displaying the time elapsed between the start of the trace on which said A pulse appears and the start of the trace on which said B pulse appears.

2. A long range navigation system according to claim 1 in which said timing means includes a local oscillator and the means for adjustably and continuously varying the frequency of said timing means comprises an adjustable capacitor connected in said oscillator circuit for varying the frequency thereof over a predetermined range.

3. A long range navigation system according to claim 2 in which said adjustable capacitor includes means normally maintaining the capacitor at the medial position of its adjustment and manually operable means for selectively varying the adjustment thereof over a range on either side of said medial position.

4. A long range navigation system according to claim 3 in which said means normally maintaining the capacitor at its medial position of adjustment includes a spring opposing the operation of said manually operable means.

5. In a long range navigation system wherein periodically recurring time related pulses are radiated from a plurality of transmitting stations, a receiver for receiving said pulses including a cathode ray tube on which said received pulses are displayed, a deflection circuit for the electron beam of said cathode ray tube, means energizing said deflection circuit including a local oscillator for producing a plurality of successively recurring traces on the screen of said cathode ray tube the time of initiation of which depends on the instantaneous frequency of said local oscillator, means for causing respective received pulses to appear on respective ones of said successively recurring traces, means for delaying the initiation of at least one of said traces whereby the pulse appearing thereon may be aligned with a pulse appearing on another of said traces, means for measuring the amount by which the initiation of said trace is delayed, means connected in said oscillator circuit for varying the instantaneous frequency thereof over a range of frequencies for adjusting the time of initiation of said successively recurring traces, and means connected to said oscillator for automatically controlling the frequency thereof to maintain the initiation of the recurring traces in synchronism with the time of recurrence of desired received pulses after the initiation of the traces has been adjusted within a restricted range of times of occurrence.

6. A long range navigation system according to claim 5 in which the means for automatically controlling the frequency of the oscillator comprises means for generating a first gate pulse whose time of initiation is in timed relation to the initiation of one of the recurrent traces and which is terminated after a definite time interval, means for generating a second gate pulse whose time of initiation substantially coincides with the time of termination of said first gate pulse and which is terminated after a definite time interval and means operative by the relative coincidence of the first and second gate pulses with pulses received from one of the transmitting stations for adjusting the frequency of said oscillator.

7. A long range navigation system according to claim 6 in which said oscillator includes a tank circuit and the means operative by the relative coincidence of the first and second gate pulses with selected received pulses includes a reactance tube and a condenser connected to an output electrode of said reactance tube and to said tank circuit.

8. A long range navigation system according to claim 7 in which the means operative by the relative coincidence of the first and second gate pulses with selected received pulses additionally includes a condenser means variably charged in one sense or an opposite sense depending on the relative coincidence of said received pulse with said first gate pulse or said second gate pulse, a circuit connecting said condenser means with the input of said reactance tube and a circuit for impressing a portion of the signal generated by said oscillator on the input circuit of said reactance tube.

9. In a long range navigation system wherein periodically recurring time related pulses are radiated from a plurality of transmitting stations, a receiver for receiving said pulses including a cathode ray tube on which said received pulses are displayed, a deflection circuit for the electron beam of said cathode ray tube, means energizing said deflection circuit including a local oscillator for producing a plurality of successively recurring traces on the screen of said cathode ray tube the time of initiation of which depends on the instantaneous frequency of said local oscillator, means for causing respective received pulses to appear on respective ones of said successively recurring traces, means for delaying the initiation of at least one of said traces whereby the pulse appearing thereon may be aligned with a pulse appearing on another of said traces, means for measuring the amount by which the initiation of said trace is delayed, said oscillator including a tank circuit for varying the instantaneous frequency of said oscillator over a range of frequencies thereby adjusting the time of initiation of said recurring traces within a restricted range, a first pulse generator energized by said deflection circuit energizing means generating a first gate pulse whose time of initiation is in timed relation to the initiation of one of said traces and which is terminated after a definite time interval, a second pulse generator connected to said first pulse generator generating a second gate pulse whose time of initiation coincides with the time of termination of said first gate pulse and which is terminated after a definite time interval, a first coincidence tube having a control electrode connected to receive the gate pulse generated by said first pulse generator, a second coincidence tube having a control electrode connected to receive the gate pulse generated by said second pulse generator, a circuit connecting the cathode of one of said coincidence tubes to the anode of the other, a common output circuit including a condenser connected between said circuit connecting said anode and cathode and ground whereby said condenser is charged in one sense or the opposite sense depending on the relative conductivity of said first and second coincidence tubes, a circuit for applying pulses derived from selected received pulses to said first and second coincidence tubes and for rendering said tubes conductive only at such times as a gate pulse and a pulse derived from said selected received pulses are conjointly impressed thereon whereby the amount and sense of the charge on said condenser is a measure of the relative coincidence in time of the selected received pulses and the first and second gate pulses, and means for controlling the frequency of the oscillator in accordance with the amount and sense of the charge on said condenser.

10. A long range navigation system according to claim 9 in which the means for controlling the frequency of the oscillator in accordance with the amount and sense of the charge on said condenser includes a reactance tube having its input connected to said condenser and its output connected to said tank circuit.

11. A long range navigation system according to claim 10 in which the means for controlling the frequency of the oscillator in accordance with the amount and sense of the charge on said condenser additionally includes a circuit for impressing a portion of the energy generated by said oscillator on the input circuit of said reactance tube and a condenser connected between the output circuit of said reactance tube and said oscillator tank circuit.

12. A long range navigation system according to claim 5 in which the means connected in said oscillator circuit for varying the instantaneous frequency thereof comprises a variable condenser including spring means normally retaining it at its medial position of adjustment.

13. A long range navigation system according to claim 9 in which the means connected in said tank circuit for varying the instantaneous frequency of the oscillator comprises a variable condenser including spring means normally retaining it at its medial position of adjustment.

14. In a long range navigation system wherein periodically recurring time related pulses are received from a plurality of transmitting stations, the pulses displayed on different sweeps of a cathode ray tube, the beginning of one sweep being adjusted until the pulse displayed thereon occurs at a preselected point representing zero time, the beginning of at least another sweep on which a pulse from another transmitting station appears being adjustably delayed until coincidence of pulses is obtained and the amount being measured to determine the time differential between reception of pulses from different stations, the method of operation which comprises, generating local oscillations, initiating said sweeps at a time dependent on the instantaneous frequency of the local oscillations, varying the instantaneous frequency of said local oscillations over a range of frequencies thereby adjusting the time of initiation of said sweeps within a restricted range of times and automatically controlling the frequency of the local oscillations when the initiation of the sweeps has been adjusted within the restricted range thereby maintaining the initiation of the sweeps in synchronism with the recurrence of desired received pulses.

15. In a long range navigation system wherein periodically recurring time related pulses are received from a plurality of transmitting stations, the pulses displayed on different sweeps of a cathode ray tube, the beginning of one sweep being adjusted until the pulse displayed thereon occurs at a preselected point representing zero time, the beginning of at least another sweep on which a pulse from another transmitting station appears being adjustably delayed until coincidence of pulses is obtained and the amount of delay being measured to determine the time differential between reception of pulses from different stations, the method of operation which comprises, generating local oscillations, initiating said sweeps at a time dependent on the instantaneous frequency of the local oscillations, varying the instantaneous frequency of said local oscillations over a range of frequencies thereby adjusting the time of initiation of said sweeps within a restricted range of times, generating a first gate pulse whose time of initiation is in timed relation to the initiation of one of the sweeps and which is terminated after a definite time interval, generating a second gate pulse whose time of initiation substantially coincides with the time of termination of said first gate pulse and which is terminated after a definite time interval and adjusting the frequency of said oscillations by the relative coincidence of said first and second gate pulses with pulses received from one of the transmitting stations.

GEORGE R. PAINE.
WILLIAM C. PLATT.

REFERENCES CITED

The following references are of record in the file of this patent:

UNITED STATES PATENTS

| Number | Name | Date |
|---|---|---|
| 2,430,570 | Hulst | Nov. 11, 1947 |
| 2,432,158 | Hulst et al. | Dec. 9, 1947 |
| 2,442,692 | Holst et al. | June 1, 1948 |